United States Patent
Derginer et al.

(10) Patent No.: US 12,134,454 B1
(45) Date of Patent: Nov. 5, 2024

(54) MARINE PROPULSION SYSTEM AND METHOD WITH SINGLE REAR DRIVE AND LATERAL MARINE DRIVE

(71) Applicant: Brunswick Corporation, Mettawa, IL (US)

(72) Inventors: Matthew E. Derginer, Butte des Mort, WI (US); Mark R. Hanson, Oshkosh, WI (US); Peter C. Schneider, Oshkosh, WI (US); David J. Belter, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 195 days.

(21) Appl. No.: 17/869,515

(22) Filed: Jul. 20, 2022

(51) Int. Cl.
   *B63H 25/42* (2006.01)
   *B63H 21/21* (2006.01)
   *G05D 1/00* (2024.01)

(52) U.S. Cl.
   CPC ........... *B63H 25/42* (2013.01); *B63H 21/213* (2013.01); *G05D 1/0206* (2013.01); *B63H 2021/216* (2013.01)

(58) Field of Classification Search
   None
   See application file for complete search history.

(56) References Cited

U.S. PATENT DOCUMENTS

| | | |
|---|---|---|
| 3,688,252 A | 8/1972 | Thompson |
| 3,715,571 A | 2/1973 | Braddon |
| 3,754,399 A | 8/1973 | Ono et al. |
| 3,771,483 A | 11/1973 | Spencer |
| 3,842,789 A | 10/1974 | Bergstedt |
| 4,231,310 A | 11/1980 | Muramatsu |

(Continued)

FOREIGN PATENT DOCUMENTS

| | | |
|---|---|---|
| CA | 2279165 | 1/2001 |
| CA | 2282064 | 1/2001 |

(Continued)

OTHER PUBLICATIONS

"Joystick Driving: Experience a New and Intuitive Way of Boat Driving," Volvo Penta, Goteborg, Sweden, Mar. 2017, 2 pages.

(Continued)

*Primary Examiner* — Todd Melton
(74) *Attorney, Agent, or Firm* — Andrus Intellectual Property Law, LLP

(57) ABSTRACT

A marine propulsion system for a marine vessel includes one steerable rear marine drive positioned along the center line of the marine vessel and a lateral marine drive positioned at a bow region of the marine vessel. The rear marine drive is steerable about a vertical steering axis to a range of steering angles. The lateral marine drive is positioned at a fixed angle with respect to the marine vessel and configured to generate lateral thrust on the marine vessel. A user input device is operable by a user to provide a propulsion demand input commanding surge movement, sway movement, and yaw movement of the marine vessel, and the control system is configured to control steering and thrust of the rear marine drive and thrust of the lateral marine drive based on the propulsion demand input to generate the surge movement, sway movement, and/or the yaw movement commanded by the user.

26 Claims, 12 Drawing Sheets

(56) References Cited

U.S. PATENT DOCUMENTS

| | | |
|---|---|---|
| 4,253,149 A | 2/1981 | Cunningham et al. |
| 4,428,052 A | 1/1984 | Robinson et al. |
| 4,501,560 A | 2/1985 | Brandt et al. |
| 4,513,378 A | 4/1985 | Antkowiak |
| 4,589,850 A | 5/1986 | Soderbaum |
| 4,625,583 A | 12/1986 | Kronogard |
| 4,643,687 A | 2/1987 | Yano et al. |
| 4,652,878 A | 3/1987 | Borgersen |
| 4,741,713 A | 5/1988 | Ohlsson et al. |
| 4,781,631 A | 11/1988 | Uchida et al. |
| 4,813,895 A | 3/1989 | Takahashi |
| 4,892,494 A | 1/1990 | Ferguson |
| 4,939,661 A | 7/1990 | Barker et al. |
| 4,975,709 A | 12/1990 | Koike |
| 5,067,918 A | 11/1991 | Kobayashi |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A | 2/1996 | Robertson et al. |
| 5,736,962 A | 4/1998 | Tendler |
| 5,884,213 A | 3/1999 | Carlson |
| 6,059,226 A | 5/2000 | Cotton et al. |
| 6,092,007 A | 7/2000 | Cotton et al. |
| 6,113,443 A | 9/2000 | Eichinger |
| 6,142,841 A | 11/2000 | Alexander, Jr. et al. |
| 6,146,219 A | 11/2000 | Blanchard |
| 6,230,642 B1 | 5/2001 | McKenney et al. |
| 6,234,100 B1 | 5/2001 | Fadeley et al. |
| 6,234,853 B1 | 5/2001 | Lanyi et al. |
| 6,279,499 B1 | 8/2001 | Griffith, Sr. et al. |
| 6,308,651 B2 | 10/2001 | McKenney et al. |
| 6,336,833 B1 | 1/2002 | Rheault et al. |
| 6,340,290 B1 | 1/2002 | Schott et al. |
| 6,342,775 B1 | 1/2002 | Sleder, Sr. |
| 6,350,164 B1 | 2/2002 | Griffith, Sr. et al. |
| 6,354,237 B1 | 3/2002 | Gaynor et al. |
| 6,354,892 B1 | 3/2002 | Staerzl |
| 6,361,387 B1 | 3/2002 | Clarkson |
| 6,363,874 B1 | 4/2002 | Griffith, Sr. |
| 6,377,889 B1 | 4/2002 | Soest |
| 6,402,577 B1 | 6/2002 | Treinen et al. |
| 6,416,368 B1 | 7/2002 | Griffith, Sr. et al. |
| 6,428,371 B1 | 8/2002 | Michel et al. |
| 6,446,003 B1 | 9/2002 | Green et al. |
| 6,485,341 B1 | 11/2002 | Layni et al. |
| 6,488,552 B2 | 12/2002 | Kitsu et al. |
| 6,511,354 B1 | 1/2003 | Gonring et al. |
| 6,582,260 B2 | 6/2003 | Nemoto et al. |
| 6,583,728 B1 | 6/2003 | Staerzl |
| 6,604,479 B2 | 8/2003 | McKenney et al. |
| 6,678,589 B2 | 1/2004 | Robertson et al. |
| 6,705,907 B1 | 3/2004 | Hedlund |
| 6,743,062 B1 | 6/2004 | Jones |
| 6,773,316 B1 | 8/2004 | Keehn, Jr. |
| 6,848,382 B1 | 2/2005 | Bekker |
| 6,875,065 B2 | 4/2005 | Tsuchiya et al. |
| 6,884,130 B2 | 4/2005 | Okabe |
| 6,885,919 B1 | 4/2005 | Wyant et al. |
| 6,910,927 B2 | 6/2005 | Kanno |
| 6,923,136 B1 | 8/2005 | D'Alessandro |
| 6,994,046 B2 | 2/2006 | Kaji et al. |
| 6,995,527 B2 | 2/2006 | DePasqua |
| 7,001,230 B2 | 2/2006 | Saito |
| RE39,032 E | 3/2006 | Gonring et al. |
| 7,018,252 B2 | 3/2006 | Simard et al. |
| 7,036,445 B2 | 5/2006 | Kaufmann et al. |
| 7,059,922 B2 | 6/2006 | Kawanishi |
| 7,118,434 B2 | 10/2006 | Arvidsson et al. |
| 7,127,333 B2 | 10/2006 | Arvidsson |
| 7,128,625 B2 | 10/2006 | Saito |
| 7,131,386 B1 | 11/2006 | Caldwell |
| 7,188,581 B1 | 3/2007 | Davis et al. |
| 7,243,009 B2 | 7/2007 | Kaji |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,389,165 B2 | 6/2008 | Kaji |
| 7,389,735 B2 | 6/2008 | Kaji et al. |
| 7,398,742 B1 | 7/2008 | Gonring |
| 7,416,458 B2 | 8/2008 | Suemori et al. |
| 7,438,013 B2 | 10/2008 | Mizutani |
| 7,467,595 B1 | 12/2008 | Lanyi et al. |
| 7,476,134 B1 | 1/2009 | Fell et al. |
| 7,481,688 B2 | 1/2009 | Kobayashi |
| 7,506,599 B2 | 3/2009 | Mizutani |
| 7,527,537 B2 | 5/2009 | Mizutani |
| 7,533,624 B2 | 5/2009 | Mizutani |
| 7,538,511 B2 | 5/2009 | Samek |
| 7,540,253 B2 | 6/2009 | Mizutani |
| 7,577,526 B2 | 8/2009 | Kim et al. |
| 7,674,145 B2 | 3/2010 | Okuyama et al. |
| 7,727,036 B1 | 6/2010 | Poorman et al. |
| 7,736,204 B2 | 6/2010 | Kaji |
| 7,753,745 B2 | 7/2010 | Schey et al. |
| 7,813,844 B2 | 10/2010 | Gensler et al. |
| 7,844,374 B2 | 11/2010 | Mizutani |
| 7,876,430 B2 | 1/2011 | Montgomery |
| 7,883,383 B2 | 2/2011 | Larsson |
| 7,930,986 B2 | 4/2011 | Mizutani |
| 7,959,479 B2 | 6/2011 | Ryuman et al. |
| 7,972,189 B2 | 7/2011 | Urano |
| 8,011,981 B2 | 9/2011 | Mizutani |
| 8,046,121 B2 | 10/2011 | Mizutani |
| 8,050,630 B1 | 11/2011 | Arbuckle |
| 8,051,792 B2 | 11/2011 | Mochizuki |
| 8,079,822 B2 | 12/2011 | Kitsunai et al. |
| 8,082,100 B2 | 12/2011 | Grace et al. |
| 8,105,046 B2 | 1/2012 | Kitsunai et al. |
| 8,113,892 B1 | 2/2012 | Gable et al. |
| 8,131,412 B2 | 3/2012 | Larsson et al. |
| 8,145,370 B2 | 3/2012 | Borrett |
| 8,145,371 B2 | 3/2012 | Rae et al. |
| 8,155,811 B2 | 4/2012 | Noffsinger et al. |
| 8,170,734 B2 | 5/2012 | Kaji |
| 8,170,735 B2 | 5/2012 | Kaji |
| 8,195,381 B2 | 6/2012 | Arvidsson |
| 8,265,812 B2 | 9/2012 | Pease |
| 8,271,155 B2 | 9/2012 | Arvidsson |
| 8,276,534 B2 | 10/2012 | Mochizuki |
| 8,277,270 B2 | 10/2012 | Ryuman |
| 8,376,793 B2 | 2/2013 | Chiecchi |
| 8,417,399 B2 | 4/2013 | Arbuckle et al. |
| 8,428,801 B1 | 4/2013 | Nose et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,622,012 B2 | 1/2014 | Olofsson |
| 8,645,012 B2 | 2/2014 | Salmon et al. |
| 8,682,515 B2 | 3/2014 | Ito |
| 8,688,298 B2 | 4/2014 | Mizutani et al. |
| 8,694,248 B1 | 4/2014 | Arbuckle et al. |
| 8,761,976 B2 | 6/2014 | Salmon et al. |
| 8,797,141 B2 | 8/2014 | Best et al. |
| 8,831,802 B2 | 9/2014 | Mizutani et al. |
| 8,831,868 B2 | 9/2014 | Grace et al. |
| 8,838,305 B2 | 9/2014 | Mizutani |
| 8,944,865 B1 | 2/2015 | Krabacher et al. |
| 8,965,606 B2 | 2/2015 | Mizutani |
| 8,983,780 B2 | 3/2015 | Kato et al. |
| 9,032,891 B2 | 5/2015 | Kinoshita et al. |
| 9,032,898 B2 | 5/2015 | Widmark |
| 9,033,752 B2 | 5/2015 | Takase |
| 9,039,468 B1 | 5/2015 | Arbuckle et al. |
| 9,039,469 B1 | 5/2015 | Calamia et al. |
| 9,079,651 B2 | 7/2015 | Nose et al. |
| 9,108,710 B1 | 8/2015 | McChesney et al. |

(56) References Cited

U.S. PATENT DOCUMENTS

| | | | |
|---|---|---|---|
| 9,126,667 B2 * | 9/2015 | Mizutani | B63H 21/213 |
| 9,132,900 B2 | 9/2015 | Salmon et al. | |
| 9,150,294 B2 | 10/2015 | Ito et al. | |
| 9,150,298 B2 | 10/2015 | Mizushima | |
| 9,162,743 B1 | 10/2015 | Grace et al. | |
| 9,176,215 B2 | 11/2015 | Nikitin et al. | |
| 9,183,711 B2 | 11/2015 | Fiorini et al. | |
| 9,195,234 B2 | 11/2015 | Stephens | |
| 9,248,898 B1 | 2/2016 | Kirchhoff | |
| 9,261,048 B2 | 2/2016 | Suzuki et al. | |
| 9,278,740 B1 | 3/2016 | Andrasko et al. | |
| 9,296,456 B2 | 3/2016 | Mochizuki et al. | |
| 9,355,463 B1 | 5/2016 | Arambel et al. | |
| 9,359,057 B1 | 6/2016 | Andrasko et al. | |
| 9,376,188 B2 | 6/2016 | Okamoto | |
| 9,377,780 B1 | 6/2016 | Arbuckle et al. | |
| 9,440,724 B2 | 9/2016 | Suzuki et al. | |
| 9,545,988 B2 | 1/2017 | Clark | |
| 9,594,374 B2 | 3/2017 | Langford-Wood | |
| 9,594,375 B2 | 3/2017 | Jopling | |
| 9,598,160 B2 | 3/2017 | Andrasko et al. | |
| 9,615,006 B2 | 4/2017 | Terre et al. | |
| 9,616,971 B2 | 4/2017 | Gai | |
| 9,650,119 B2 | 5/2017 | Morikami et al. | |
| 9,663,211 B2 | 5/2017 | Suzuki et al. | |
| 9,694,885 B2 | 7/2017 | Combee | |
| 9,718,530 B2 | 8/2017 | Kabel et al. | |
| 9,727,202 B2 | 8/2017 | Bamba | |
| 9,729,802 B2 | 8/2017 | Frank et al. | |
| 9,733,645 B1 | 8/2017 | Andrasko et al. | |
| 9,734,583 B2 | 8/2017 | Walker et al. | |
| 9,764,807 B2 | 9/2017 | Frisbie et al. | |
| 9,862,473 B2 | 1/2018 | Rydberg et al. | |
| 9,878,769 B2 | 1/2018 | Kinoshita et al. | |
| 9,904,293 B1 | 2/2018 | Heap et al. | |
| 9,908,605 B2 | 3/2018 | Hayashi et al. | |
| 9,927,520 B1 | 3/2018 | Ward et al. | |
| 9,937,984 B2 | 4/2018 | Herrington et al. | |
| 9,950,778 B2 | 4/2018 | Kabel et al. | |
| 9,963,214 B2 | 5/2018 | Watanabe et al. | |
| 9,969,473 B2 | 5/2018 | Okamoto | |
| 9,988,134 B1 | 6/2018 | Gable et al. | |
| 9,996,083 B2 | 6/2018 | Vojak | |
| 10,011,342 B2 | 7/2018 | Gai et al. | |
| 10,025,312 B2 | 7/2018 | Langford-Wood | |
| 10,037,701 B2 | 7/2018 | Harnett | |
| 10,048,690 B1 | 8/2018 | Hilbert et al. | |
| 10,055,648 B1 | 8/2018 | Grigsby et al. | |
| 10,071,793 B2 | 9/2018 | Koyano et al. | |
| 10,078,332 B2 | 9/2018 | Tamura et al. | |
| 10,094,309 B2 | 10/2018 | Hagiwara et al. | |
| 10,095,232 B1 | 10/2018 | Arbuckle et al. | |
| 10,106,238 B2 | 10/2018 | Sidki et al. | |
| 10,124,870 B2 | 11/2018 | Bergmann et al. | |
| 10,191,153 B2 | 1/2019 | Gatland | |
| 10,191,490 B2 | 1/2019 | Akuzawa et al. | |
| 10,431,099 B2 | 1/2019 | Stewart et al. | |
| 10,198,005 B2 | 2/2019 | Arbuckle et al. | |
| 10,259,555 B2 | 4/2019 | Ward et al. | |
| 10,281,917 B2 | 5/2019 | Tyers | |
| 10,322,778 B2 | 6/2019 | Widmark et al. | |
| 10,330,031 B2 | 6/2019 | Ohsara et al. | |
| 10,336,426 B2 | 7/2019 | Naito et al. | |
| 10,338,800 B2 | 7/2019 | Rivers et al. | |
| 10,372,976 B2 | 8/2019 | Kollmann et al. | |
| 10,377,458 B1 | 8/2019 | McGinley | |
| 10,437,248 B1 | 10/2019 | McGinley | |
| 10,444,349 B2 | 10/2019 | Gatland | |
| 10,457,371 B2 | 10/2019 | Hara et al. | |
| 10,464,647 B2 | 11/2019 | Tokuda | |
| 10,472,036 B2 | 11/2019 | Spengler et al. | |
| 10,501,161 B2 | 12/2019 | Tamura et al. | |
| 10,507,899 B2 | 12/2019 | Imamura et al. | |
| 10,562,602 B1 | 2/2020 | Gable et al. | |
| 10,618,617 B2 | 4/2020 | Suzuki et al. | |
| 10,625,837 B2 | 4/2020 | Ichikawa et al. | |
| 10,633,072 B1 | 4/2020 | Arbuckle et al. | |
| 10,640,190 B1 | 5/2020 | Gonring | |
| 10,671,073 B2 | 6/2020 | Arbuckle et al. | |
| 10,739,771 B2 | 8/2020 | Miller et al. | |
| 10,760,470 B2 | 9/2020 | Li et al. | |
| 10,782,692 B2 | 9/2020 | Tamura et al. | |
| 10,787,238 B2 | 9/2020 | Watanabe et al. | |
| 10,795,366 B1 | 10/2020 | Arbuckle et al. | |
| 10,845,811 B1 | 11/2020 | Arbuckle et al. | |
| 10,871,775 B2 | 12/2020 | Hashizume et al. | |
| 10,884,416 B2 | 1/2021 | Whiteside et al. | |
| 10,913,524 B1 | 2/2021 | Wald et al. | |
| 10,921,802 B2 | 2/2021 | Bertrand et al. | |
| 10,926,855 B2 | 2/2021 | Derginer et al. | |
| 10,953,973 B2 | 3/2021 | Hayashi et al. | |
| 11,008,926 B1 | 5/2021 | Osthelder et al. | |
| 11,009,880 B2 | 5/2021 | Miller et al. | |
| 11,021,220 B2 | 6/2021 | Yamamoto et al. | |
| 11,072,399 B2 | 7/2021 | Terada | |
| 11,091,243 B1 | 8/2021 | Gable et al. | |
| 11,117,643 B2 | 9/2021 | Sakashita et al. | |
| 11,161,575 B2 | 11/2021 | Koyano et al. | |
| 11,247,753 B2 | 2/2022 | Arbuckle et al. | |
| 11,370,519 B2 * | 6/2022 | Pettersson | B63J 99/00 |
| 2002/0127926 A1 | 9/2002 | Michel et al. | |
| 2003/0137445 A1 | 7/2003 | Rees et al. | |
| 2004/0221787 A1 | 11/2004 | McKenney et al. | |
| 2005/0075016 A1 | 4/2005 | Bertetti et al. | |
| 2005/0170713 A1 | 8/2005 | Okuyama | |
| 2006/0012248 A1 | 1/2006 | Matsushita et al. | |
| 2006/0058929 A1 | 3/2006 | Fossen et al. | |
| 2006/0089794 A1 | 4/2006 | DePasqua | |
| 2006/0217011 A1 | 9/2006 | Morvillo | |
| 2007/0017426 A1 | 1/2007 | Kaji et al. | |
| 2007/0032923 A1 | 2/2007 | Mossman et al. | |
| 2007/0089660 A1 | 4/2007 | Bradley et al. | |
| 2007/0178779 A1 | 8/2007 | Takada et al. | |
| 2007/0203623 A1 | 8/2007 | Saunders et al. | |
| 2009/0037040 A1 | 2/2009 | Salmon et al. | |
| 2009/0111339 A1 | 4/2009 | Suzuki | |
| 2010/0076683 A1 | 3/2010 | Chou | |
| 2010/0138083 A1 | 6/2010 | Kaji | |
| 2011/0104965 A1 | 5/2011 | Atsusawa | |
| 2011/0153125 A1 | 6/2011 | Arbuckle et al. | |
| 2011/0172858 A1 | 7/2011 | Gustin et al. | |
| 2012/0072059 A1 | 3/2012 | Glaeser | |
| 2012/0248259 A1 | 10/2012 | Page et al. | |
| 2013/0297104 A1 | 11/2013 | Tyers et al. | |
| 2015/0032305 A1 | 1/2015 | Lindeborg | |
| 2015/0089427 A1 | 3/2015 | Akuzawa | |
| 2015/0276923 A1 | 10/2015 | Song et al. | |
| 2015/0346722 A1 | 12/2015 | Herz et al. | |
| 2015/0378361 A1 | 12/2015 | Walker et al. | |
| 2016/0214534 A1 | 7/2016 | Richards et al. | |
| 2017/0176586 A1 | 6/2017 | Johnson et al. | |
| 2017/0205829 A1 | 7/2017 | Tyers | |
| 2017/0253314 A1 | 9/2017 | Ward | |
| 2017/0255201 A1 | 9/2017 | Arbuckle et al. | |
| 2017/0365175 A1 | 12/2017 | Harnett | |
| 2018/0046190 A1 | 2/2018 | Hitachi et al. | |
| 2018/0057132 A1 | 3/2018 | Ward et al. | |
| 2018/0081054 A1 | 3/2018 | Rudzinsky et al. | |
| 2018/0122351 A1 | 5/2018 | Simonton | |
| 2018/0259338 A1 | 9/2018 | Stokes et al. | |
| 2018/0259339 A1 | 9/2018 | Johnson et al. | |
| 2019/0202541 A1 | 7/2019 | Pettersson et al. | |
| 2019/0251356 A1 | 8/2019 | Rivers | |
| 2019/0258258 A1 | 8/2019 | Tyers | |
| 2019/0283855 A1 | 9/2019 | Nilsson | |
| 2019/0382090 A1 | 12/2019 | Suzuki et al. | |
| 2020/0108902 A1 | 4/2020 | Wong et al. | |
| 2020/0130797 A1 | 4/2020 | Mizutani | |
| 2020/0247518 A1 | 8/2020 | Dannenberg | |
| 2020/0249678 A1 | 8/2020 | Arbuckle et al. | |
| 2020/0269962 A1 | 8/2020 | Gai et al. | |
| 2020/0298941 A1 | 9/2020 | Terada et al. | |
| 2020/0298942 A1 | 9/2020 | Terada et al. | |
| 2020/0324864 A1 | 10/2020 | Inoue | |

(56) References Cited

U.S. PATENT DOCUMENTS

| | | |
|---|---|---|
| 2020/0331572 A1 | 10/2020 | Inoue |
| 2020/0361587 A1 | 11/2020 | Husberg |
| 2020/0369351 A1 | 11/2020 | Behrendt et al. |
| 2020/0391838 A1 | 12/2020 | Inoue et al. |
| 2020/0391840 A1 | 12/2020 | Inoue et al. |
| 2020/0398964 A1 | 12/2020 | Fujima et al. |
| 2021/0061426 A1 | 3/2021 | Gai et al. |
| 2021/0070407 A1 | 3/2021 | Ishii |
| 2021/0070414 A1 | 3/2021 | Bondesson et al. |
| 2021/0086876 A1 | 3/2021 | Inoue et al. |
| 2021/0088667 A1 | 3/2021 | Heling et al. |
| 2021/0107617 A1 | 4/2021 | Nakatani |
| 2021/0141396 A1 | 5/2021 | Kinoshita |
| 2021/0147053 A1 | 5/2021 | Motose et al. |
| 2021/0155333 A1 | 5/2021 | Mizutani |
| 2021/0163114 A1 | 6/2021 | Bondesson et al. |
| 2021/0179244 A1 | 6/2021 | Mizutani |
| 2021/0197940 A1 | 7/2021 | Takase |
| 2021/0197944 A1 | 7/2021 | Takase |
| 2021/0255627 A1 | 8/2021 | Snyder et al. |
| 2021/0261229 A1 | 8/2021 | Terada |
| 2021/0263516 A1 | 8/2021 | Miller et al. |
| 2021/0286362 A1 | 9/2021 | Malouf et al. |
| 2021/0291943 A1 | 9/2021 | Inoue et al. |
| 2021/0347449 A1 | 11/2021 | Dake et al. |
| 2021/0362819 A1* | 11/2021 | Potts .............. B63H 25/42 |

FOREIGN PATENT DOCUMENTS

| | | |
|---|---|---|
| CN | 102015437 | 10/2013 |
| CN | 106864696 B | 1/2019 |
| CN | 109639314 A | 4/2019 |
| CN | 209008841 U | 6/2019 |
| CN | 107810139 | 8/2019 |
| CN | 209192180 U | 8/2019 |
| CN | 209321220 U | 8/2019 |
| CN | 209410311 U | 9/2019 |
| CN | 209410312 U | 9/2019 |
| CN | 209410313 U | 9/2019 |
| CN | 209410315 U | 9/2019 |
| CN | 210101960 U | 2/2020 |
| CN | 210101961 U | 2/2020 |
| CN | 210191790 U | 3/2020 |
| CN | 109625191 B | 4/2020 |
| CN | 109693776 B | 4/2020 |
| CN | 109591992 B | 3/2021 |
| CN | 112968511 A | 6/2021 |
| DE | 906907 | 3/1954 |
| DE | 11 2013 004908 | 6/2015 |
| EP | 423901 | 4/1991 |
| EP | 816962 | 1/1998 |
| EP | 1 775 212 | 4/2007 |
| EP | 1477402 | 1/2008 |
| EP | 1873052 | 1/2008 |
| EP | 1535833 | 12/2009 |
| EP | 2536622 | 12/2012 |
| EP | 1923307 | 2/2013 |
| EP | 1923309 | 5/2013 |
| EP | 1923308 | 6/2013 |
| EP | 2813423 | 8/2016 |
| EP | 3 182 155 | 6/2017 |
| EP | 2250077 | 2/2018 |
| EP | 3298302 | 10/2019 |
| EP | 3643597 | 4/2020 |
| EP | 3354557 B1 | 5/2020 |
| EP | 3498589 | 7/2020 |
| EP | 3805088 | 4/2021 |
| EP | 3808646 | 4/2021 |
| EP | 1770007 | 5/2021 |
| EP | 3692604 A1 | 6/2021 |
| EP | 3842332 | 6/2021 |
| EP | 3842333 | 6/2021 |
| EP | 3889030 A1 | 10/2021 |
| EP | 3889031 A1 | 10/2021 |
| GB | 1173442 | 12/1969 |
| GB | 2180374 | 3/1987 |
| JP | 50090088 | 7/1975 |
| JP | S58061097 | 4/1983 |
| JP | 59110298 U | 7/1984 |
| JP | 60033710 B | 8/1985 |
| JP | 61003200 U | 1/1986 |
| JP | 62175296 A | 7/1987 |
| JP | 62175298 A | 7/1987 |
| JP | 63103797 A | 5/1988 |
| JP | 63103798 A | 5/1988 |
| JP | 63103800 A | 5/1988 |
| JP | 01178099 A | 7/1989 |
| JP | 01284906 A | 11/1989 |
| JP | 01285486 A | 11/1989 |
| JP | 04019296 A | 1/1992 |
| JP | H04101206 | 2/1992 |
| JP | 04310496 A | 11/1992 |
| JP | H07223591 | 8/1995 |
| JP | 08056458 A | 3/1996 |
| JP | 08056512 A | 3/1996 |
| JP | 08056513 A | 3/1996 |
| JP | 08058681 A | 3/1996 |
| JP | 08127388 A | 5/1996 |
| JP | 08187038 A | 7/1996 |
| JP | 08266130 A | 10/1996 |
| JP | 08266176 A | 10/1996 |
| JP | 08276892 A | 10/1996 |
| JP | 08276893 A | 10/1996 |
| JP | 09048392 A | 2/1997 |
| JP | 09048395 A | 2/1997 |
| JP | 09048396 A | 2/1997 |
| JP | 09052597 A | 2/1997 |
| JP | 09109988 A | 4/1997 |
| JP | 09142375 A | 6/1997 |
| JP | 2926533 | 7/1997 |
| JP | 09188293 A | 7/1997 |
| JP | 09298929 A | 11/1997 |
| JP | 09308352 A | 12/1997 |
| JP | 10007090 A | 1/1998 |
| JP | 10109689 A | 4/1998 |
| JP | 11020780 A | 1/1999 |
| JP | H07246998 | 10/1999 |
| JP | 2001146766 A | 5/2001 |
| JP | 001206283 A | 7/2001 |
| JP | 2002000038 A | 1/2002 |
| JP | 3299664 B2 | 7/2002 |
| JP | 3326055 B2 | 9/2002 |
| JP | 3352847 B2 | 12/2002 |
| JP | 3387699 B2 | 3/2003 |
| JP | 3469978 B2 | 11/2003 |
| JP | 3609902 B2 | 1/2005 |
| JP | 3621374 B2 | 2/2005 |
| JP | 3634007 B2 | 3/2005 |
| JP | 2006159027 A | 6/2006 |
| JP | 2007248336 | 9/2007 |
| JP | 2007307967 A | 11/2007 |
| JP | 4105827 B2 | 6/2008 |
| JP | 4105828 B2 | 6/2008 |
| JP | 2008221933 A | 9/2008 |
| JP | 2009227035 | 10/2009 |
| JP | 4421316 B2 | 2/2010 |
| JP | 2010158965 A | 7/2010 |
| JP | 4809794 B2 | 11/2011 |
| JP | 4925950 B2 | 5/2012 |
| JP | 5042906 | 7/2012 |
| JP | 5189454 B2 | 4/2013 |
| JP | 5213562 B2 | 6/2013 |
| JP | 5226355 | 7/2013 |
| JP | 5449510 B2 | 3/2014 |
| JP | 5535373 B2 | 7/2014 |
| JP | 2015033857 A | 2/2015 |
| JP | 2015033858 A | 2/2015 |
| JP | 2015199373 A | 11/2015 |
| JP | 5885707 B2 | 3/2016 |
| JP | 2016049903 | 4/2016 |
| JP | 2016074250 | 5/2016 |
| JP | 2016159805 A | 9/2016 |
| JP | 2016216008 A | 12/2016 |
| JP | 2017136932 A | 8/2017 |

(56) References Cited

FOREIGN PATENT DOCUMENTS

| | | |
|---|---|---|
| JP | 2017178242 | 10/2017 |
| JP | 2017185885 A | 10/2017 |
| JP | 6405568 B2 | 10/2018 |
| JP | 6447387 B2 | 1/2019 |
| JP | 2020032871 A | 3/2020 |
| JP | 6820274 | 1/2021 |
| JP | 2021071800 A | 5/2021 |
| JP | 2021084565 A | 6/2021 |
| JP | 2021160373 A | 10/2021 |
| KR | 20140011245 | 1/2014 |
| SE | 540567 | 10/2018 |
| WO | WO 1992005505 | 4/1992 |
| WO | WO 9305406 | 3/1993 |
| WO | WO 2006040785 | 4/2006 |
| WO | WO 2006 062416 | 6/2006 |
| WO | WO 2006058400 | 6/2006 |
| WO | WO 2008066422 | 6/2008 |
| WO | WO 2008111249 | 8/2008 |
| WO | WO 2009113923 | 9/2009 |
| WO | WO 2011099931 | 8/2011 |
| WO | WO 2012010818 | 1/2012 |
| WO | WO 2016091191 A1 | 6/2016 |
| WO | WO 2016188963 | 12/2016 |
| WO | WO 2016209767 | 12/2016 |
| WO | WO 2017 095235 | 6/2017 |
| WO | WO 2017167905 | 10/2017 |
| WO | WO 2017168234 | 10/2017 |
| WO | WO 2017202468 A1 | 11/2017 |
| WO | WO 2018162933 | 9/2018 |
| WO | WO 2018201097 | 11/2018 |
| WO | WO 2018232376 | 12/2018 |
| WO | WO 2018232377 | 12/2018 |
| WO | WO 2019011451 A1 | 1/2019 |
| WO | 2018179447 A1 | 4/2019 |
| WO | WO 2019081019 A1 | 5/2019 |
| WO | WO 2019096401 | 5/2019 |
| WO | WO 2019126755 | 6/2019 |
| WO | WO 2019157400 | 8/2019 |
| WO | WO 2019201945 | 10/2019 |
| WO | 2020/069750 | 4/2020 |
| WO | WO 2020147967 A1 | 7/2020 |
| WO | WO 2020238814 A1 | 12/2020 |
| WO | WO 2020251552 A1 | 12/2020 |
| WO | WO 2021058388 A1 | 4/2021 |

OTHER PUBLICATIONS

Kirchoff, Unpublished U.S. Appl. No. 17/131,115, filed Dec. 22, 2020, published as US 2022/0194542 A1.

Kraus, Unpublished U.S. Appl. No. 17/185,289, filed Feb. 25, 2021, published as US 2022/0266971 A1, issued as U.S. Pat. No. 11,572,146 B2.

Arbuckle et al., "System and Method for Controlling a Position of a Marine Vessel Near an Object," Unpublished U.S. Appl. No. 15/818,226, filed Nov. 20, 2017, U.S. Pat. No. 10,324,468 B2.

Arbuckle et al., "System and Method for Controlling a Position of a Marine Vessel Near an Object," Unpublished U.S. Appl. No. 15/818,233, filed Nov. 20, 2017, U.S. Pat. No. 10,429,845.

John Bayless, Adaptive Control of Joystick Steering in Recreational Boats, Marquette University, Aug. 2017, https://epublications.marquette.edu/cgi/viewcontent.cgi?article=1439&context=theses_open.

Mercury Marine, Axius Generation 2 Installation Manual, Jul. 2010, pp. 22-25.

Mercury Marine, Joystick Piloting for Outboards Operation Manual, 2013, pp. 24-26.

Mercury Marine, Zeus 3000 Series Pod Drive Models Operation Manual, 2013, pp. 49-52.

Poorman et al., "Multilayer Control System and Method for Controlling Movement of a Marine Vessel", Unpublished U.S. Appl. No. 11/965,583, filed Dec. 27, 2007.

Unpublished U.S. Appl. No. 16/535,946, U.S. Pat. No. 11,372,411.

Ward et al., "Methods for Controlling Movement of a Marine Vessel Near an Object," Unpublished U.S. Appl. No. 15/986,395, filed May 22, 2018, U.S. Pat. No. 10,845,812.

\* cited by examiner

MARINE PROPULSION SYSTEM AND METHOD WITH SINGLE REAR DRIVE AND LATERAL MARINE DRIVE

FIELD

The present disclosure generally relates to methods and systems for propelling marine vessels, and more particularly to systems and methods for providing lateral and rotational propulsion.

BACKGROUND

Many different types of marine drives are well known to those skilled in the art. For example, steerable marine drives mounted to the rear of the vessel, such as outboard motors that are attached to the transom of a marine vessel and stern drive systems that extend in a rearward direction from the stern of a marine vessel, may sometimes be provided in groups of two or more and separately steerable to enable surge, sway, and yaw directional control, sometimes referred to as joysticking. The steerable marine drives are each steerable about their steering axis to a range of steering angles, which is effectuated by a steering actuator. Lateral marine drives may be positioned to exert lateral force on the marine vessel, such as bow thrusters. Marine drives generally comprise a powerhead, such as an electric motor or an internal combustion engine, driving rotation of a drive shaft that is directly or indirectly connected to a propeller on a propeller shaft and that imparts rotation thereto.

The following U.S. Patents are incorporated herein by reference, in entirety:

U.S. Pat. No. 6,234,853 discloses a docking system that utilizes the marine propulsion unit of a marine vessel, under the control of an engine control unit that receives command signals from a joystick or push button device, to respond to a maneuver command from the marine operator. The docking system does not require additional marine drives other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone.

U.S. Pat. No. 6,402,577 discloses a hydraulic steering system in which a steering actuator is an integral portion of the support structure of a marine propulsion system. A steering arm is contained completely within the support structure of the marine propulsion system and disposed about its steering axis. An extension of the steering arm extends into a sliding joint which has a linear component and a rotational component which allows the extension of the steering arm to move relative to a moveable second portion of the steering actuator. The moveable second portion of the steering actuator moves linearly within a cylinder cavity formed in a first portion of the steering actuator.

U.S. Pat. No. 7,398,742 discloses a steering assist system providing differential thrusts by two or more marine drives in order to create a more effective turning moment on a marine vessel. The differential thrusts can be selected as a function of the magnitude of turn commanded by an operator of the marine vessel and, in addition, as a function of the speed of the marine vessel at the time when the turning command is received.

U.S. Pat. No. 7,467,595 discloses a method for controlling the movement of a marine vessel that rotates one of a pair of marine drives and controls the thrust magnitudes of two marine drives. A joystick is provided to allow the operator of the marine vessel to select port-starboard, forward-reverse, and rotational direction commands that are interpreted by a controller which then changes the angular position of at least one of a pair of marine drives relative to its steering axis.

U.S. Pat. No. 9,039,468 discloses a system that controls speed of a marine vessel that includes first and second marine drives that produce first and second thrusts to propel the marine vessel. A control circuit controls orientation of the marine drives between an aligned position in which the thrusts are parallel and an unaligned position in which the thrusts are non-parallel. A first user input device is moveable between a neutral position and a non-neutral detent position. When the first user input device is in the detent position and the marine drives are in the aligned position, the thrusts propel the marine vessel in a desired direction at a first speed. When a second user input device is actuated while the first user input device is in the detent position, the marine drives move into the unaligned position and propel the marine vessel in the desired direction at a second, decreased speed without altering the thrusts.

U.S. Pat. No. 10,926,855 discloses a method for controlling low-speed propulsion of a marine vessel powered by a marine propulsion system having a plurality of propulsion devices that includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

U.S. Pat. No. 11,091,243 discloses a propulsion system on a marine vessel that includes at least one steerable propulsion device and at least one lateral thruster. A steering wheel is mechanically connected to and operable by a user to steer the at least one propulsion device. A user interface device is operable by a user to provide at least a lateral thrust command to command lateral movement and a rotational thrust command to command rotational movement of the vessel. A controller is configured to determine a difference between a steering position of the propulsion device and a centered steering position. A user interface display is controllable to indicate at least one of the steering position of the propulsion device and the difference between the steering position and the centered steering position. The controller is further configured to determine that the steering position is within a threshold range of the centered steering position.

U.S. Publication No. 2021/0286362 discloses a marine propulsion system that includes at least two parallel propulsion devices that each generate forward and reverse thrusts, wherein the parallel propulsion devices are oriented such that their thrusts are parallel to one another, and at least one drive position sensor configured to sense a drive angle of the parallel propulsion devices. A lateral thruster is configured to generate starboard and port thrust to propel the marine vessel. A user input device is operable by a user to provide at least a lateral thrust command to command lateral movement of the marine vessel and a rotational thrust command to command rotational movement of the marine vessel. A controller is configured to control the parallel propulsion devices and the lateral thruster based on the lateral steering input and/or the rotational steering input and the drive angle so as to provide the lateral movement and/or the rotational movement commanded by the user without controlling the drive angle.

U.S. application Ser. No. 17/131,115 discloses a method of controlling an electric marine propulsion system configured to propel a marine vessel including measuring at least one parameter of an electric motor in the electric marine propulsion system and determining that the parameter measurement indicates an abnormality in the electric marine propulsion system. A reduced operation limit is then determined based on the at least one parameter measurement, wherein the reduced operation limit includes at least one of a torque limit, an RPM limit, a current limit, and a power limit. The electric motor is then controlled such that the reduced operation limit is not exceeded.

U.S. application Ser. No. 17/185,289 discloses a stowable propulsion system for a marine vessel. A base is configured to be coupled to the marine vessel. A shaft has a proximal end and a distal end with a length axis defined therebetween, where the shaft is pivotably coupled to the base and pivotable about a transverse axis between a stowed position and a deployed position, and where the distal end is closer to the marine vessel when in the stowed position than in the deployed position. A gearset is engaged between the shaft and the base, where the gearset rotates the shaft about the length axis when the shaft is pivoted between the stowed position and the deployed position. A propulsion device is coupled to the distal end of the shaft. The propulsion device is configured to propel the marine vessel in water when the shaft is in the deployed position.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one aspect of the present disclosure, a marine propulsion system for a marine vessel includes one steerable rear marine drive positioned along the center line of the marine vessel and configured to generate forward and reverse thrust and a lateral marine drive positioned at a bow region of the marine vessel. The rear marine drive is steerable about a vertical steering axis to a range of steering angles. The lateral marine drive is positioned at a fixed angle with respect to the marine vessel and configured to generate lateral thrust on the marine vessel. A user input device is operable by a user to provide a propulsion demand input commanding surge movement, sway movement, and yaw movement of the marine vessel, and the control system is configured to control steering and thrust of the rear marine drive and thrust of the lateral marine drive based on the propulsion demand input to generate the surge movement, sway movement, and/or the yaw movement commanded by the user.

In one embodiment, the propulsion system is configured to operate in at least a first mode where the user input device controls only the lateral marine drive and a second mode where the user input device controls both the lateral marine drive and the rear marine drive, and the control system is configured to receive user selection of the second mode prior to controlling steering and thrust of the rear marine drive and thrust of the lateral marine drive based on the propulsion demand input. Optionally, the user input device is a joystick and the control system configured to operate in the second mode such that a movement of the joystick simultaneously controls both the lateral marine drive and the rear marine drive.

In a further embodiment, the system configured to operate in the second mode to separately control the lateral marine drive and the rear marine drive. Optionally, the user input device is a joystick and wherein the system is configured such that a twist movement of the joystick controls one of lateral thrust produced by the lateral marine drive or steering of the rear marine drive, and sideways deflection of the joystick controls the other one of lateral thrust produced by the lateral marine drive or steering of the rear marine drive.

In another embodiment, the control system is further configured to determine a maximum allowable lateral output based on a speed characteristic, and control the lateral marine drive based on the user input command such that the lateral marine drive does not exceed the maximum allowable lateral output. Optionally, the control system is configured to progressively decrease the maximum allowable lateral output as the speed characteristic increases above a threshold speed, and wherein the speed characteristic is at least one of a vessel speed and a rotational speed of the rear marine drive.

In another embodiment, the system further includes a control model stored in memory accessible by the control system, the control model representing hull characteristics and propulsion system characteristics for the marine vessel, and the control system is configured to utilize the control model to determine a thrust command for at least one of the lateral marine drive and the rear marine drive. Optionally, the control model includes a closed-loop yaw controller configured to determine a lateral thrust command based at least in part on a sensed yaw motion of the marine vessel, wherein the control system is configured to control the lateral marine drive to effectuate the lateral thrust command.

In another embodiment, the control system is further configured to calculate a thrust command for each of the lateral marine drive and the rear marine drive and a steering position command for the rear marine drive based on the propulsion demand input and a location of each of at least the lateral marine drive and the rear marine drive with respect to a center of turn of the marine vessel.

In another embodiment, the system includes a map stored in memory accessible by the control system, the map configured to correlate all possible propulsion demand inputs from the user input device to thrust commands for each of the lateral marine drive and the rear marine drive, and the control system is configured to utilize the map to determine a thrust command for each of the lateral marine drive and the rear marine drive based on the propulsion demand input.

In one aspect of the present disclosure, where a marine propulsion system includes one steerable rear marine drive positioned along the center line of a marine vessel and a lateral marine drive positioned at a fixed angle on a bow region of the marine vessel and configured to generate lateral thrust on the marine vessel, one embodiment of a method of controlling the marine propulsion system includes receiving input from a user input device, a propulsion demand input commanding a surge movement, a sway movement, and/or a yaw movement of the marine vessel and then determining a rear thrust command and a steering position command for the rear marine drive and a lateral thrust command for the lateral marine drive based on the propulsion demand input. The rear marine drive is then controlled based on the rear thrust command and the steering position command, and the lateral marine drive is controlled based on the lateral thrust command so as to generate the surge movement, the sway movement, and/or the yaw movement commanded by the user.

In one embodiment, the marine propulsion system is configured to operate in at least a first mode where the user input device controls only the lateral marine drive and a second mode where the user input device controls both the lateral marine drive and the rear marine drive, and the method further includes receiving user selection of the second mode prior to controlling steering and thrust of the rear marine drive and thrust of the lateral marine drive based on the propulsion demand input.

In another embodiment, the method further includes determining a maximum allowable lateral output based on a speed characteristic, and controlling the lateral marine drive based on the user input command such that the lateral marine drive does not exceed the maximum allowable lateral output. Optionally, the method further includes progressively decreasing the maximum allowable lateral output as the speed characteristic increases above a threshold speed, and wherein the speed characteristic is at least one of a vessel speed and a rotational speed of the rear marine drive.

In another embodiment, the rear thrust command and the steering position command for the rear marine drive and the lateral thrust command for the lateral marine drive are based on the propulsion demand input and a location of each of at least the lateral marine drive and the rear marine drive with respect to a center of turn of the marine vessel.

In another embodiment, determining the lateral thrust command includes utilizing a closed-loop yaw controller to determine the lateral thrust command based at least in part on sensed yaw motion of the marine vessel.

In another embodiment, wherein the received propulsion demand input commands zero yaw movement, a magnitude and a direction of the lateral thrust command is determined based on the sensed yaw motion to generate an opposing yaw thrust.

In another embodiment, the method further includes storing a map configured to correlate all possible propulsion demand inputs from the user input device to thrust commands for each of the lateral marine drive and the rear marine drive and to a steering command for the rear marine drive, and utilizing the map to determine the lateral thrust command and the rear thrust and steering commands based on the propulsion demand input received from the user input device.

In one aspect of the present disclosure, a marine propulsion system for a marine vessel includes a lateral marine drive positioned at a bow region of the marine vessel, wherein the lateral marine drive is configured to generate lateral thrust on the marine vessel and a user input device operable by a user to provide a propulsion demand input to control the lateral marine drive. A control system is configured to determine a maximum allowable lateral output based on a speed characteristic and to control the lateral marine drive based on the user input command such that the lateral marine drive does not exceed the maximum allowable lateral output.

In one aspect of the present disclosure, for a marine propulsion system including a lateral marine drive on a bow region of a marine vessel that is configured to generate lateral thrust on the marine vessel, a method of controlling marine propulsion includes receiving, from a user input device, a propulsion demand input commanding lateral thrust from the lateral marine drive and determining a maximum allowable lateral output based on a speed characteristic. A lateral thrust command for the lateral marine drive is determined based on the propulsion demand input and the maximum allowable lateral output. The lateral marine drive is then controlled based on the lateral thrust command such that the lateral marine drive does not exceed the maximum allowable lateral output.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
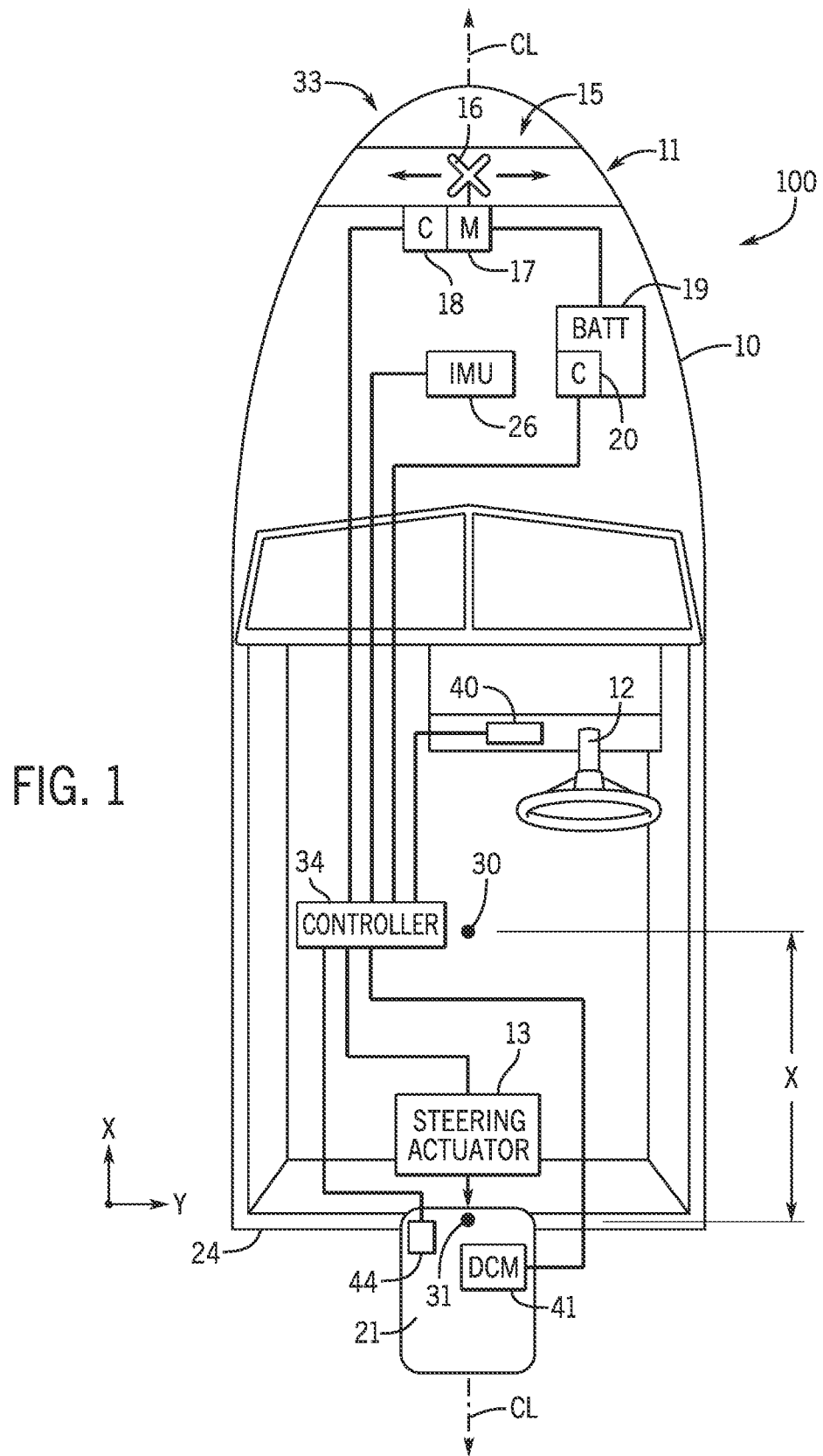
FIG. 1 is a schematic illustration of a marine vessel with one embodiment of a propulsion system according to the present disclosure.

The inventors have recognized a need for vessel control systems and methods that provide improved control over lateral and rotational movement of the marine vessel and enable a full range of vessel movement, such as via joystick control, on a marine vessel with a single rear propulsion device. Certain movement directions, such as sideways movement (or sway) and turning in place, is not possible on vessels with only a single rear drive. Thus, single drive vessels are not able to perform a full range of joystick control.

Based on the foregoing problems and challenges in the relevant art, the inventors developed the disclosed propulsion systems and methods providing a full range of joystick control on vessels with only a single rear drive. In addition to a single steerable rear marine drive positioned at the stern of the marine vessel, a fixed lateral marine drive is positioned at the bow region and configured to generate starboard and port direction lateral thrusts on the side of vessel.

A single user input device, such as a joystick, is configured to provide a unified control input for both the lateral drive and the rear drive—i.e., to control steering and thrust of the rear marine drive and to control thrust of a lateral marine drive based on a propulsion demand input at the user input device. Thus, the propulsion system is configured to optimize the starboard and port thrusts from the lateral drive, in conjunction with the rear thrust from the steerable rear drive, to most efficiently and effectively generate sway movement and/or yaw movement commanded by the user. The lateral marine drive may be a discrete drive that operates only at one predetermined rotational speed and thus is only controllable to be turned on and off (such as pulsed on and off, where pulse widths can be lengthened to increase lateral thrust output). Alternatively, the lateral marine drive may be a variable speed drive wherein the rotational speed is controllable by the control system to generate variable thrust outputs.

The lateral marine drive may be mounted in an area of the bow of the marine vessel and controllable in forward and reverse directions to generate starboard and port directional thrusts at the bow. The lateral marine drive may be mounted at a fixed angle with respect to the vessel such that it is not steerable and is configured to generate starboard and port thrusts at a fixed angle (such as perpendicular to the centerline of the vessel). In certain embodiments, the starboard or port thrust, including the yaw moment of the lateral marine drive thrust, is integrated into and accounted for in the propulsion control scheme such that the thrusts generated by the lateral marine drive and the rear marine drive are totaled and each individual drive is controlled so that the total sway thrust effectuated by all drives in the propulsion system results in the commanded lateral sway movement and/or surge movement and the total yaw thrust effectuated by all drives in the propulsion system results in the commanded rotational yaw movement (or lack thereof).

The control system and method are configured to operate the lateral marine drive, the rear marine drive, or both simultaneously depending on the propulsion demand input. As explained in more detail below, the selection of which drive(s) to operate for effectuating operator-demanded thrust may also depend on a mode of operation of the user interface system and/or a speed characteristic, such as a vessel speed or an output (e.g., RPM) of the rear marine drive. For example, when the propulsion demand input is within a high yaw demand range and/or a high sway demand range, and thus large yaw and/or sway acceleration is demanded, both the lateral marine drive and the rear marine drive are operated in an additive way to increase the yaw and/or lateral component of the total thrust produced. The lateral thrust produced by the lateral marine drive is coincident with the yaw and/or sway component of the thrust from the rear drive to achieve a greater yaw or sway velocity and/or a greater yaw or sway acceleration with just the lateral marine drive alone.

Conversely, the lateral marine drive may be controlled to produce a lateral thrust that opposes a yaw and/or lateral component of a total thrust of the rear marine drive, or opposes a lateral or yaw force imposed on the vessel from the surroundings, to achieve a lesser sway velocity and/or a lesser yaw velocity, or to eliminate any sway or yaw component when straight forward or reverse propulsion is demanded. For example, the lateral marine drive, such as a lateral thruster, may be used to efficiently counteract any unwanted yaw that may occur when effectuated a commanded surge motion, such as when moving the vessel in reverse to back into a slip or other docking location.

In an example where the lateral marine drive is an electric drive, such as variable speed thruster, thrust magnitude and direction generated by the lateral marine drive can be quickly and precisely controlled to fine-tune the total yaw or sway thrust effectuated by the propulsion system. Utilizing the lateral thruster to make quick lateral thrust adjustments lessens the shifting and steering changes required from the rear drive, thereby yielding smoother, quieter, and more responsive joysticking experience.

In certain yaw and/or sway demand ranges, or in certain operation modes, the control system may be configured to operate only the lateral marine drive or only the rear marine drive to generate the commanded thrust. For example, the control system may be configured to operate only the lateral marine drive to generate yaw thrust when the propulsion demand input is within a low yaw demand range. Where the lateral marine drive is an electric drive and the rear marine drive is combustion-powered, controlling at least a portion of the thrust range using only the rear marine drive may be effectuated to conserve battery power utilized by the lateral marine drive.

FIG. 1 is a schematic representation of a marine vessel 10 equipped with propulsion system 100 including one rear marine drive 21 positioned at the stern 24, such as attached to the transom. The single rear marine drive 21 may be mounted along a centerline CL of vessel 10, which is to be understood as generally laterally centered with respect to the beam of the vessel 10 such that when the steerable rear marine drive 21 is in a centered steering position it propels the marine vessel approximately or exactly straight ahead (under ideal conditions with no current, wind, or other lateral forces). The single rear marine drive 21 may be, for example, an outboard drive, a stern drive, an inboard drive, a jet drive, or any other type of steerable drive. The rear marine drive 21 is steerable, having a steering actuator 13 configured to rotate the drive 21 about its vertical steering axis 31. The steering axis 31 is positioned at a distance X from the center of turn (COT) 30, which could also be the effective center of gravity (COG). The marine vessel 10 is maneuvered by causing the rear marine drive to rotate about its steering axis 31. The rear marine drive 21 is rotated in response to an operator's manipulation of the steering wheel 12 or user input device 40, which is communicatively connected to the steering actuator 13 to rotate the marine drive 21. Rotating the rear marine drive 21 and effectuating thrust thereby cause rotation of the marine vessel 10 about the effective COT 30.

The propulsion system 100 further includes a lateral marine drive 15 configured to effectuate lateral thrust on the vessel 10 in the starboard and port directions. The lateral marine drive is fixed, not steerable, such that it produces port-direction or starboard-direction lateral thrusts at fixed angles with respect to the marine vessel, such as perpendicular to the centerline CL. In the depicted example, the lateral marine drive 15 is an electric drive positioned at a bow region 11 of the vessel 10 configured to effectuate lateral thrust at the bow, which may also be referred to as a bow thruster. The bow region 11 is near the bow of the vessel so as to be in front (toward the bow) of the COT 30. Bow thrusters are known to those skilled in the art, as are other types and locations of marine drive arrangements configured to only effectuate lateral thrusts on the vessel 10, which may be placed at other locations on the vessel 10 besides the bow region 11. The lateral marine drive 15 may also be deployable for use and retractable when not in use, such as deployable for docking and stowed for on plane boating. Exemplary deployable lateral marine drives are described in U.S. application Ser. Nos. 17/185,289, 17/388,850, and 17/553,245, which are hereby incorporated by reference in their entireties. In embodiments where the lateral marine drive 15 is deployable and retractable in response to a user input, such as a user input to engage a docking or other joysticking mode where the lateral drive 15 is utilized. The lateral marine drive 15 may be a discrete drive, or discrete thruster, that operates only at a predetermined RPM and thus is only controllable by turning on and off the drive. Alternatively, the lateral marine drive 15 may be a proportional drive, or proportional thruster, wherein the rotational speed (e.g., rotations per minute RPM) is controllable by the control system 33 between a minimum RPM and a maximum RPM that the drive is capable or rated to provide. A person having ordinary skill in the art will understand in view of the present disclosure that the disclosed propulsion system 100 may include other types and locations of lateral marine drives 15, which may be an alternative to or in addition to a lateral drive 15 positioned at the bow.

The lateral marine drive 15 may include a propeller 16, sometimes referred to as a fan, that is rotated by a bi-directional motor 17 in forward or reverse direction to effectuate lateral thrust in the starboard or port directions. In such an embodiment, the lateral marine drive 15 is configured to rotate in a first direction to generate a starboard direction lateral thrust and to rotate in an opposite direction of the first direction to generate a port direction lateral thrust. The controller 34 may be communicatively connected to a drive controller 18 for the lateral marine drive 15 to control activation and direction of thrust by the lateral marine drive 15. Where the lateral drive 15 is configured as a discrete drive, the controller 18 provides on/off and directional control of the motor 17, and thus rotate in the clockwise and counterclockwise directions at a single speed. The controller 34 may be configured to modulate the duty cycle of the discrete lateral drive to achieve desired thrust outputs. In other embodiments, the lateral marine drive 15 is a variable speed drive, wherein the motor 17 is controllable to rotate the propeller 16 at two or more speeds. For example, the motor 17 may be a brushless DC motor configured for variable multi-speed control of the propeller 16 in both the clockwise and counterclockwise rotation directions to effectuate a range of lateral thrust outputs.

Where one or more of the marine drives 15, 21 is an electric drive—i.e., having a powerhead being an electric motor—the propulsion system 100 will include a power storage device 19 powering the motor(s) thereof. The power storage device 19, such as a battery (e.g., lithium-ion battery) or bank of batteries, stores energy for powering the electric motor(s) (e.g., motor 17) and is rechargeable, such as by connection to shore power when the electric motor is not in use or by an on-board alternator system drawing energy from engine-driven marine drives (if any) on the marine vessel. The power storage device 19 may include a battery controller 20 configured to monitor and/or control aspects of the power storage device 19. For example, the battery controller 20 may receive inputs from one or more sensors within the power storage device 19, such as a temperature sensor configured to sense a temperature within a housing of the power storage device where one or more batteries or other storage elements are located. The battery controller 20 may further be configured to receive information from current, voltage, and/or other sensors within the power storage device 19, such as to receive information about the voltage, current, and temperature of each battery cell within the power storage device 19. In addition to the temperature of the power storage device, the battery controller 20 may be configured to determine and communicate a charge level to the central controller 34 and/or another controller within the control system 33. The charge level may include one or more of, for example, a voltage level of the power storage device, a state of charge of the power storage device 19, a state of health of the power storage device 19, etc.

Figure 2A:
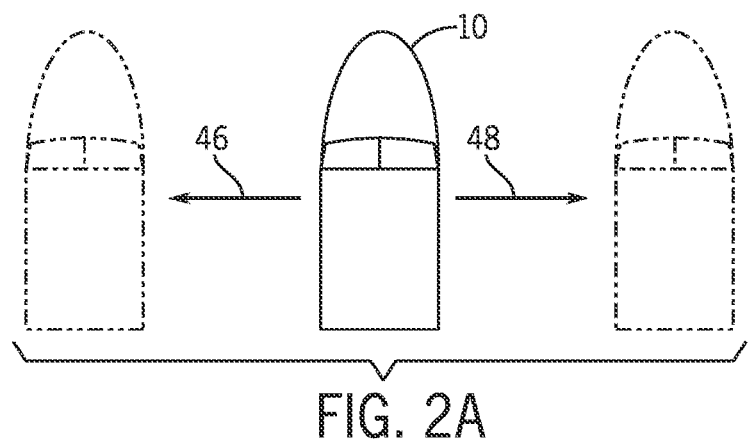
FIGS. 2A-2E are schematic illustrations of various movements of a marine vessel.
Figure 2B:
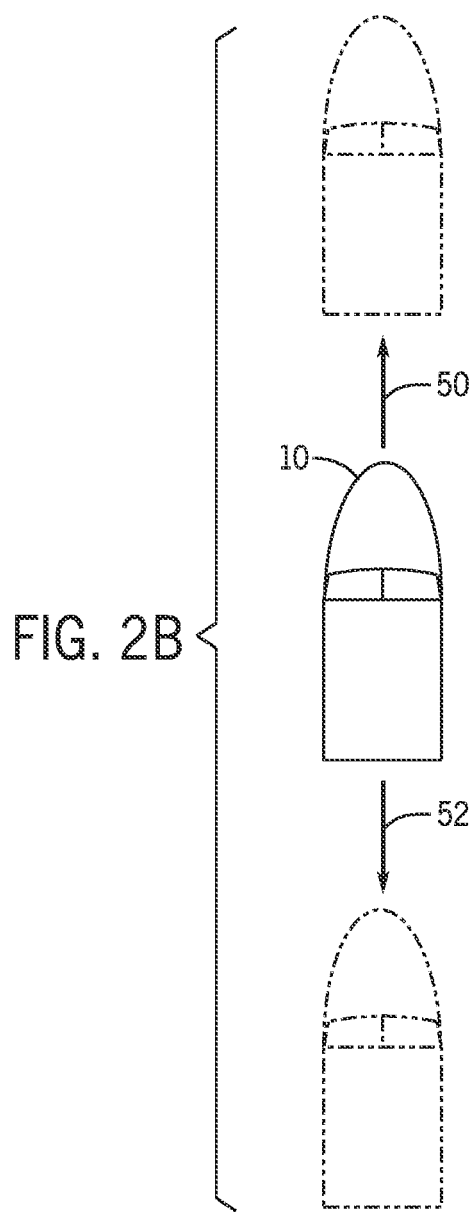
Figure 2C:
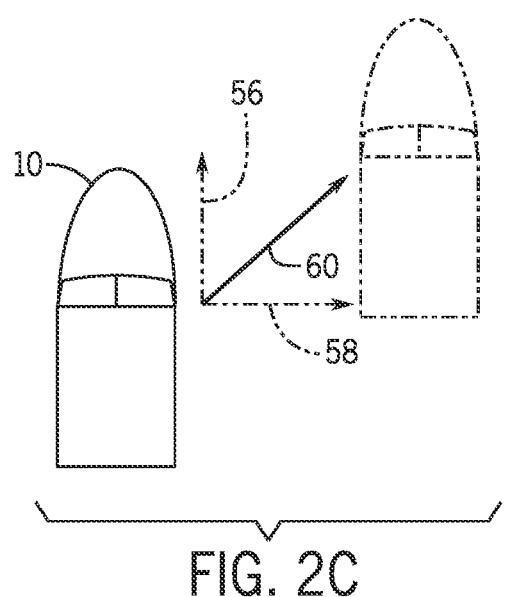
Figure 2D:
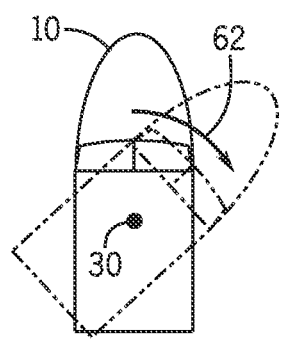
Figure 2E:
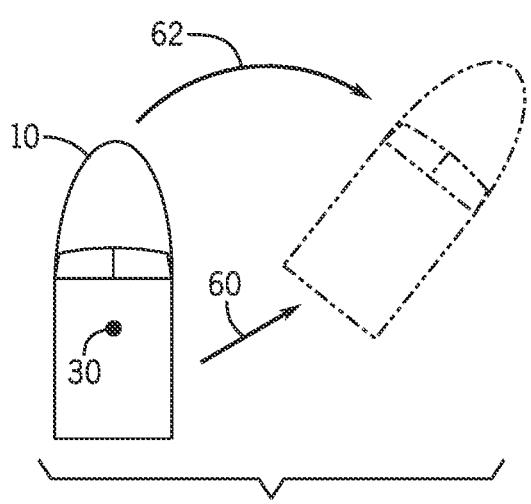

The propulsion system 100 further includes a user input device 40, such as a joystick or a keypad, operable by a user to provide at least a lateral movement demand input and rotational movement demand input. The user input device enables a user to give a lateral propulsion demand commanding sway movement of the marine vessel, or longitudinal movement along the y-axis, without requiring surge movement along the x-axis. The user input device also enables a user to give a rotational propulsion demand input commanding rotational movement of the marine vessel 10 about the COT 30 without lateral or surge movements. FIGS. 2A-2E illustrate exemplary vessel movements that may be commanded via the user input device 40. FIG. 2A shows the vessel 10 moving laterally, or sway movement, in the port direction 46 and the starboard direction 48 without any forward or reverse motion and without any rotation about its COT 30. FIG. 2B shows the vessel 10 moving in the forward 50 direction and backward 52 direction, also known as surge movement. FIG. 2C shows a combination of forward surge and starboard sway motions of the vessel 10, where the surge movement is represented by the dashed arrow 56 and the sway movement is represented by the dashed arrow 58. The resultant motion vector 60 moves the vessel in the forward and starboard directions without any rotation. FIG. 2D illustrates a clockwise rotation 62, or yaw movement, of the marine vessel 10 about the COT 30 without any translation movement, including any surge movement or sway movement. FIG. 2E illustrates a combination of yaw movement, represented by arrow 62, and surge and sway translation in the forward and starboard directions, represented by arrow 60.

The disclosed system and method enable lateral and rotational movement of the marine vessel, such as that illustrated in FIGS. 2A-2E, by effectuating steering and thrust control of the rear marine drive 21 and thrust control of the lateral marine drive 15. If the drive angle of the marine drives 15 and 21 is known, then vector analysis can be performed to effectuate any rotational movement. In an embodiment incorporating a lateral marine drive 15, lateral movement in the port direction 46 and the starboard direction 48 can be optimized. Additionally, forward direction 50 and reverse direction 52 movement can be improved and more precisely effectuated by using the lateral drive to correct for any undesired sway or rotation. The system 100 is configured to provide translational movement in other translational directions combining forward/reverse and port/starboard thrusts of the rear and lateral drives 21 and 15.

The user steering inputs provided at the user input device 40 are received by the control system 33, which may include multiple control devices communicatively connected via a communication link, such as a CAN bus (e.g., a CAN Kingdom Network), to control the propulsion system 100 as described herein. In the embodiment of FIG. 1, the control system 33 includes a central controller 34 communicatively connected to the drive control module (DCM) 41 of the rear marine drive 21, the DCM 18 of the lateral marine drive 15, and may also include other control devices such as the battery controller 20. Thereby, the controller 34 can communicate instructions to the DCM 41 of the rear drive to effectuate a commanded magnitude of thrust and a commanded direction of thrust (forward or reverse), as is necessary to effectuate the lateral and/or rotational steering inputs commanded at the user input device 40. The controller also communicates a steering position command to the steering actuator 13 to steer the marine drive 21. Drive position sensor 44 is configured to sense the steering angle, or steering position, of the drive 21. The central controller 34 also communicates a command instruction to the DCM 18 for the lateral marine drive, wherein the commands to the various drives 15, 21 are coordinated such that the total of the thrusts from the rear and lateral marine drives yields the user's propulsion demand input. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Figure 3:
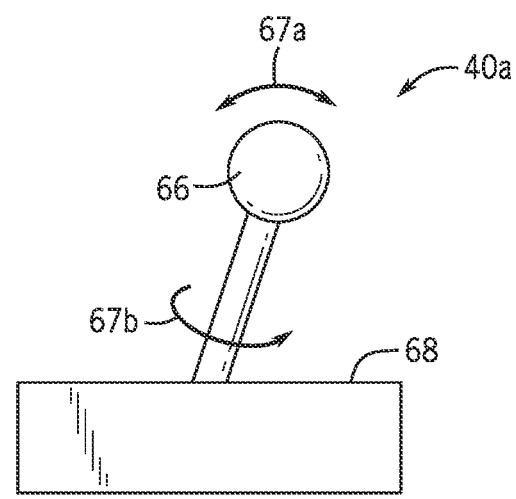
FIG. 3 illustrates an exemplary joystick user input device.
Figure 4:
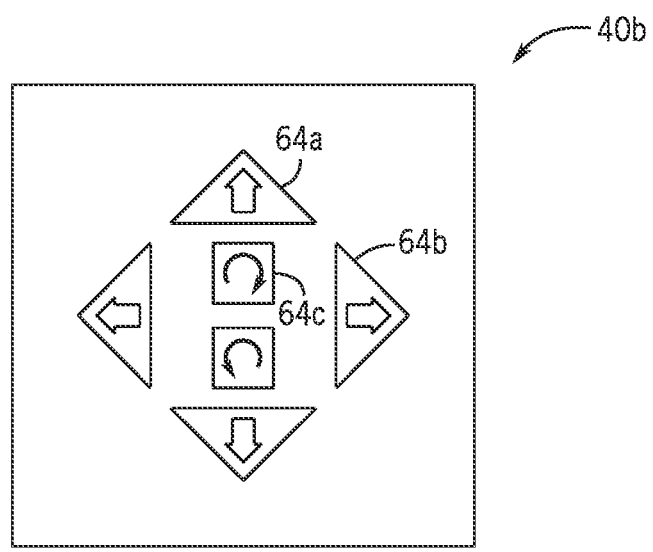
FIG. 4 illustrates an exemplary keypad user input device.

FIGS. 3 and 4 exemplify two possible types of user input devices 40. FIG. 3 depicts a well-known joystick device that comprises a base 68 and a moveable handle 66 suitable for movement by an operator. Typically, the handle can be moved left and right (represented by arrow 67a), forward and back, as well as twisted (represented by arrow 67b) relative to the base 68 to provide corresponding movement commands for the propulsion system. FIG. 4 depicts an alternative user input device 40b being a keypad with buttons 64 associated with each of the right, left, forward, backward, and rotational movement directions. Thus, a forward button 64a can be pressed by a user to provide a forward thrust command to move the marine vessel forward and key 64b can be pressed by a user to input a lateral thrust command to command lateral movement of the marine vessel 10. Similarly, the clockwise rotation key 64c can be pressed by a user to input a clockwise rotational thrust command to command clockwise rotational movement of the marine vessel 10. The other keys on the keypad 40b operate similarly. The joystick 40a and keypad 40b are merely exemplary, and other types of user input devices enabling a user to command lateral and rotational movement are within the scope of the present disclosure.

In certain embodiments, the user input device 40 may be operable in multiple modes selectable by a user. For example, the user input device 40 may be operable in a first mode to control only the lateral marine drive 15. The user input device 40 may also be operable in a second mode to control both the lateral marine drive 15 and the rear marine drive 21 in conjunction, such as according to one or more of the embodiments described herein. Alternatively or additionally, the user input device 40 may be operable in a mode to enable separate control of both the lateral marine drive 15 and the rear marine drive 21, such as where the rear marine drive is controlled by certain movements of the joystick 40a and the rear drive 21 is controlled by other movements of the joystick 40a. To provide one example for illustration, the system may be configured such that twist movement of the joystick 40a controls the lateral thrust produced by the lateral marine drive 15 and sideways deflection of the joystick 40a controls steering and/or propulsion magnitude of the rear marine drive 21. Conversely, the system may be configured such that twist movement of the joystick 40a controls thrust and/or steering of the rear marine drive 21 and sideways deflection of the joystick 40a controls the lateral thrust produced by the lateral marine drive 15. Thereby, the user can select which drive to control by selectively controlling the joystick, and can control both simultaneously, such as by manipulating the joystick with a sideways deflection and a twist movement.

The propulsion system 100 may be configured such that the user can select an operation mode for the user input device 40, for example via buttons or other user interface elements on the joystick or elsewhere at the helm. Alternatively or additionally, the system 100 may be configured to automatically select one or more of the operation modes based on engagement of various user input devices. To provide one example, the controller 34 may automatically engage the first control mode if the joystick (or other multi-directional user interface device 40) is engaged and one or more helm levers (e.g., throttle/shift levers) associated with the rear marine drive 21 are being operated to control the drive 21. There, control of the rear marine drive 21 will be provided by the helm lever and the user input device 40, such as the joystick 40a, will control only the lateral marine drive 15 (and/or any other lateral drives included within the propulsion system 100).

Where the user input device 40 is configured to operate in multiple modes, the control system 33 is configured to require user selection of the above-described second or third modes before employing the control methods described herein. Such user selection may be provided by selecting the above-described operation mode on an input element, such as a mode selection button on the joystick or a touch screen at the helm. For example, the second mode may be selectable by selecting engagement of a "joysticking mode" or a "docking mode", such as via a respective selection button on the user interface 40 or a touch screen at the helm. Alternatively, such user selection may be provided by selective engagement and disengagement of various user input elements at the helm. For example, the second mode may be selectable by engaging the user interface 40, such as the joystick or touchpad, and disengaging all other helm thrust control elements for the marine drives, such as putting all throttle/shift levers in neutral or otherwise deactivating the steering and/or thrust control functions.

The disclosed propulsion system 100 enables joystick control, or control by another user input device operable to provide lateral and rotational thrust control, of both the rear and lateral marine drives simultaneously. Optionally, such as based on a mode selection, the drives may be controlled automatically based on a single user input commanding a thrust magnitude and direction such that the drives operate to provide precise and seamless sway and yaw control of the vessel 10. Alternatively, the user input device may enable a user to input simultaneous control instructions for each of the lateral and rear drives 15 and 21.

FIGS. 5A-5E exemplify integrated control of a fix lateral drive and one rear marine drive, illustrating force coupling between the rear marine drive 21 and the lateral marine drive 15 to effectuate commanded yaw movement of the vessel. The capabilities of the propulsion system 100 to effectuate yaw movement of the marine vessel 10 using only the single rear marine drive 21 will depend on steering maneuverability of the rear marine drive 21. If the range of steering angles closely approaches or reaches 90 degrees in each direction from a centered steering position, then the marine vessel can maximally effectuate yaw movement without incidentally generating significant surge as well. This range of steering control is not possible with many drive types, but some drive arrangements do enable rotation of the propulsor to 90 degrees or more of steering in at least one direction. For example, drives with a steerable lower gearcase may enable a full +/−90 degrees of steering such that the drive can be turned sideways in each direction, or may enable a full 360 degree steering range. In other embodiments, the rear drive 21 may be steerable to 90 degrees in one direction and a lesser steering position in the other direction, such as to 30 degrees or 45 degrees. When steered to 90 degrees in the one direction, the rear drive 21 may be operable in forward or reverse rotational direction so as to selectably effectuate thrusts on the marine drive in both lateral directions.

Where a lesser steering angle range is available, some incidental surge thrust may be generated, as explained more below. To effectuate yaw movement to turn the vessel about its COT 30 without causing surge or sway movements, the control system 33 may utilize the rear marine drive 21 generating forward or reverse thrust to push the stern in the desired direction and may utilize the lateral drive 15 to push the bow in the opposite direction to generate the total commanded yaw thrust. Alternatively, yaw may be effectuated (perhaps with some minimal surge and/or sway) using only the rear drive 21 or only the lateral drive 15. Exemplary scenarios are illustrated and described below.

The controller 34 may be configured to utilize yaw rate, such as from an inertial measurement unit (IMU) 26 or other rotational sensor capable of measuring yaw of the marine vessel 10, as the basis for controlling thrust magnitude and direction from one or both drives 15 and 21. The sensed yaw rate can be used as feedback control for adjusting the thrust commands. Namely, the controller 34 may determine an expected yaw rate, or yaw velocity, associated with the lateral and/or rotational thrust command from the user input device 40 and may compare the measured yaw rate and/or rate of lateral movement from the IMU 26 to the expected value(s) and adjust the thrust commands to reduce the difference between the measured and expected values, such as between the measured yaw rate and the expected yaw rate.

Figure 5E:
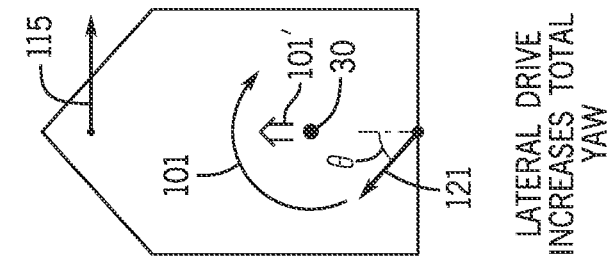
FIGS. 5A-5E depict combinations of thrust vectors by the exemplary propulsion system of FIG. 1 to effectuate exemplary yaw movements of the vessel.
Figure 5D:
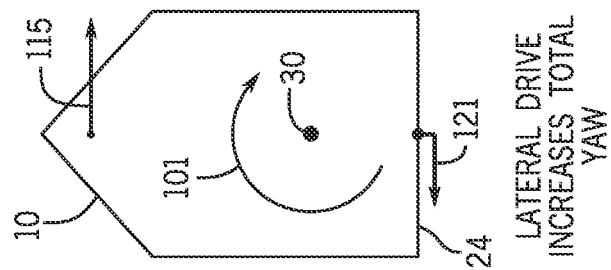
Figure 5C:
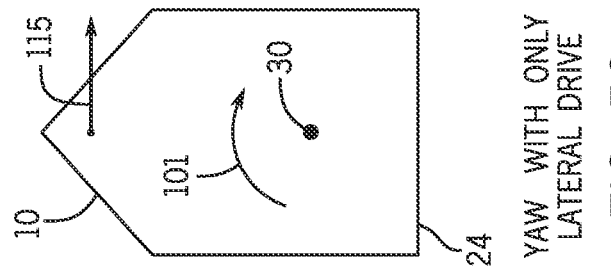
Figure 5B:
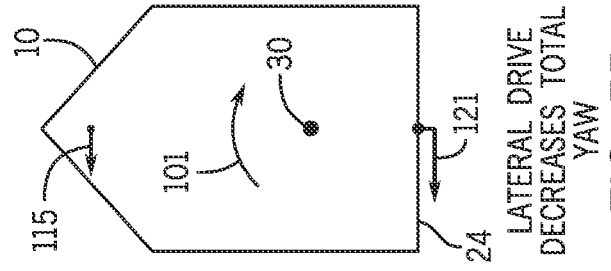
Figure 5A:
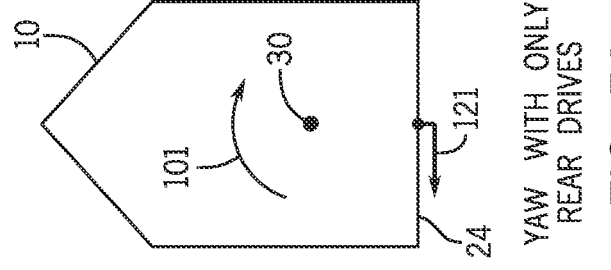

FIG. 5A illustrates an example where yaw thrust is effectuated using only the rear marine drive 21 in an arrangement where the rear marine drive is steerable to +/−90 degrees from center. The marine drive 21 is steered to a maximum steering angle, which here means that the thrusts effectuated are parallel to the stern 24 or transom. The rear marine drive 21 is controlled to effectuate a forward rotation, represented by vector 121. This results in a yaw thrust in the clockwise direction about the center of turn 30, shown by arrow 101. Some sway thrust will also be generated (not shown). The magnitude of the yaw thrust versus the sway will depend on the magnitude of the moment arm of the thrust 121, which depends on the distance X between the marine drive and the COT 30 (see FIG. 1) and will also be influenced by vessel dynamic factors such as the hull shape and water resistance on the hull.

FIG. 5B illustrates the addition of the lateral drive thrust, vector 115, to decrease the total yaw thrust on the marine vessel by counteracting a portion of the yaw thrust from the rear marine drive 21. For example, each of the lateral marine drive and the rear marine drive may have a minimum thrust that it can effectuate, meaning that there is a minimum yaw rate that can be generated by using only the lateral marine drive 15 or only the rear marine drive 21, alone. In certain embodiments, the minimum thrust for the lateral marine drive 15 may be different than that for the rear marine drive 21. For example, the lateral marine drive may be a smaller drive, and thus may have a lower minimum thrust capability. The lateral marine drive may be an electric drive and the rear marine drive 21 may be combustion-powered drive, and thus the lateral marine drive 15 may have a lower minimum thrust output capability than the rear marine drive 21. By operating the lateral marine drive 15 in opposition to the total yaw thrust from the rear marine drive 21, a lower total yaw thrust 101 and resulting yaw velocity is achievable than is possible with the rear drive 21 alone or the lateral drive 15 alone.

FIG. 5B builds on the example in FIG. 5A, where the rear marine drive 21 is steered to a maximum steering angle of 90 degrees from center and operated generate forward thrust vector, resulting in a clockwise yaw thrust. The yaw thrust generated by the rear drive 21 is partially counteracted by an opposing yaw thrust from the lateral marine drive 15. Specifically, the lateral marine drive 15 is operated to generate a thrust forcing the bow in the port direction and thus effectuating a counterclockwise yaw moment about the center of turn 30. The yaw moment generated by the lateral marine drive thrust vector 115 opposes the yaw thrust generated by the rear marine drive 21, thus decreasing the total yaw thrust. The port-direction lateral thrust 115 will also have a sway component, the magnitude of which will depend on the moment arm between the lateral marine drive 15 and the COT 30, as well as the vessel dynamics. However, the sway component may be negligible when the lateral thruster 15 is operated to generate minimal lateral thrust for a short period, and thus the main effect will be to reduce the rotational movement of the vessel so as to provide fine control over yaw movements.

FIG. 5C illustrates an example where yaw motion is generated only utilizing the lateral marine drive 15. As is noted above, the lateral marine drive 15 will also exert a sway thrust component on the vessel 10, and thus operating only the lateral marine drive to generate the yaw motion may also result in effectuating a sway motion. Where the lateral marine drive 15 is operated to effectuate a starboard direction thrust on the bow region 11, a clockwise total yaw thrust 101 about the COT is generated.

Depending on the types and thrust capabilities of the various marine drives 15 and 21 on the vessel 10, it may be preferable to meet a commanded yaw thrust utilizing only the lateral marine drive 15 or only the rear drive 21. For example, where the rear marine drive 21 are configured for high thrust output, it may be preferable to utilize only the lateral marine drive 15 when the propulsion demand input is within a low yaw demand range, which may be at or below the minimum thrust capabilities of the rear marine drive 21 and/or may yield smoother and more comfortable operation for the user by minimizing shifting of the rear marine drive.

Operating the lateral marine drive in concert with the rear marine drive can yield a greater total yaw velocity when the thrust generated by all of the marine drives are additive. FIG. 5D illustrates one example where the lateral marine drive 15 is operated to generate a thrust that is additive to the yaw thrust generated by the rear marine drive 21. Namely, the yaw component of the starboard direction thrust on the bow, represented by vector 115, adds to the yaw component of the thrust vector 121 to effectuate an even larger yaw force about the COT 30, represented by arrow 101. Thereby, the yaw acceleration is increased and the total possible yaw velocity is also increased beyond that achievable with only the rear marine drive 21 or only the lateral marine drive 15.

Further, operation of both the lateral drive 15 and the rear drive 21 can be coordinated such that the incidental sway components cancel, or at least partially counteract, each other. In the example in FIG. 5D, the sway component of the starboard direction thrust on the bow, represented by vector 115, cancels out at least a portion of the sway component resulting from the rear propulsion device 21.

FIG. 5E depicts a similar thrust arrangement ad FIG. 5D, except that the rear marine drive has a more restricted steering range. In the embodiment represented in FIG. 5D, the rear marine drive cannot be steered to +/−90 degrees and is shown steered to its lesser maximum steering position θ, such as +/−60 degrees and generating a forward thrust. In other embodiments, the maximum steering angle θ range may be greater, such as +/−80, or may be smaller, such as +/−45 degrees or +/−30 degrees. Where the rear marine drive 21 is not steerable to 90 degrees, the thrust generated at the maximum steering position θ will have a surge component 101' that is not canceled out by thrust vector 115 from the lateral marine drive 15. The magnitude of the surge component 101' will depend on the maximum steering angle +/−θ, as well as the vessel dynamics. Where the maximum steering angle θ range is significantly narrowed from 90 degrees, such as 45 degrees or less, the control system may be configured to favor utilizing the lateral drive 15 to generate only yaw movement (turn in place) when no surge movement is commanded to minimize the incidental and undesired surge movement of the vessel as much as possible.

Figure 6B:
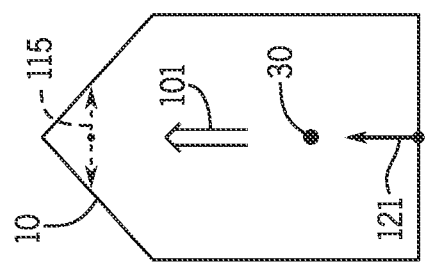
FIGS. 6A-6B depict combinations of thrust vectors by the exemplary propulsion system of FIG. 1 to cancel yaw when effectuating exemplary surge movements of the vessel.
Figure 6A:
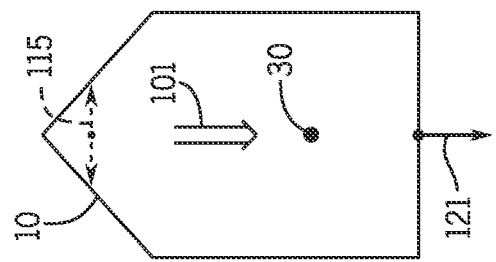

FIGS. 6A and 6B illustrate examples where surge thrust is effectuated with the rear marine drive 21, and the lateral drive 15 is operated to cancel any unwanted yaw such as to enable the marine vessel to travel straight backward or straight forward. The inventors have recognized that straight forward or backward motion is sometimes difficult to achieve with only the rear drive because there are often asymmetrical forces on the starboard and port sides of the hull, such as due to wind, waves, and current. This may be a particular issue when moving the vessel in reverse, where the wide and typically flat stern may amplify the effects of asymmetrical forces on the vessel from water and wind. Thus, the disclosed system is configured to selectively utilize the at least one lateral marine drive 15 to counteract any uncommanded yaw motion that may occur during a surge motion of the vessel 10, such as to enable the marine vessel to travel straight forward and/or straight backward.

In FIG. 6A, the rear marine drive 21 is controlled to effectuate rearward thrust 121, steered to a centered drive angle such that the thrust effectuated is perpendicular to the stern 24, to move the vessel straight backward as indicated by arrow 101. In FIG. 6B, the rear marine drive 21 is controlled to effectuate forward thrust 121, steered to a centered drive angle such that the thrust effectuated is perpendicular to the stern 24, to move the vessel straight forward. In both the rearward and forward motion examples, the lateral marine drive 15 is controlled to counteract any yaw motion of the vessel 10 that might occur, and thus may be actuated in either the forward or reverse rotational directions to effectuate starboard or port lateral thrusts 115 depending on which unwanted yaw rotation is being counteracted.

Thus, the lateral marine drive 15 is likely controlled intermittently during surge motions to effectuate the lateral thrust 115 to counteract any measured yaw change. For example, the direction and magnitude of the lateral thrust 115 may be determined and effectuated by the control system 33 in response to and based on sensed yaw changes, such as based on the direction and magnitude of yaw velocity and/or yaw acceleration of the vessel 10 measured by the IMU 26.

Figure 7A:
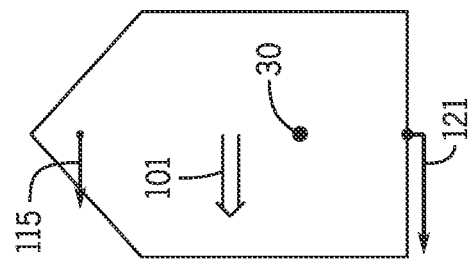
FIGS. 7A-7B depict combinations of thrust vectors by the exemplary propulsion system of FIG. 1 to effectuate exemplary sway movements of the vessel.
Figure 7B:
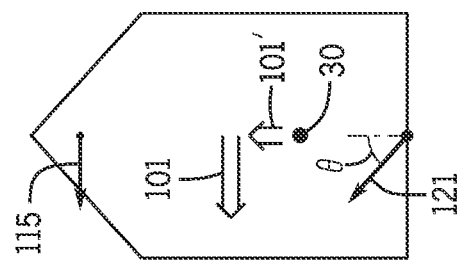

FIGS. 7A-7B exemplify integrated control of lateral and rear marine drives, illustrating force coupling between the rear marine drive 21 and the lateral marine drive 15 to effectuate sway movement of the vessel 10. To effectuate only a sway movement, and thus to move the vessel 10 laterally sideways without causing yaw or surge movements, the control system utilizes both the rear marine drive 21 and the lateral drive 15 to generate additive sway thrusts. When the sway thrusts generated by the rear drive 21 and the lateral drive 15 are in the same direction, the yaw moments are in opposite rotational directions and thus cancel one another.

FIG. 7A depicts an example where the rear marine drive 21 and the lateral marine drive 15 are each operated to generate a sway thrust in the port direction, which add together to effectuate a port side sway motion of the marine vessel 10, represented by arrow 101. The control system may be configured to control the lateral marine drive 15 and the rear marine drive 21 such that the yaw components of the respective thrusts, the yaw moments, are about equal and opposite in magnitude such that they effectively cancel each other out. The yaw component generated by each drive 15, 21 is a product of its distance from the COT 30, as well as vessel dynamics, etc., and the control system may be configured to calculate and balance work between the lateral drive 15 and the rear drive 21 such that no substantial total yaw moment results and straight sway motion is generated. Moreover, the control system may be configured to control the drives based on input from the IMU 26 so as to make adjustments to output of one or both drives 15, 21 to counteract any detected yaw motion.

The example in FIG. 7A assumes that the rear drive 21 is steerable to 90 degrees from center. This arrangement is ideal for producing sway movement of the marine vessel 10 without producing any surge movement. However, moving the rear marine drive to a +/−90 degree steering angle position will not be possible with many drive arrangements. In FIG. 7B, the rear marine drive cannot be steered to +/−90 degrees and is shown steered to its lesser maximum steering position θ, such as +/−60 degrees. In other embodiments, the maximum steering angle θ range may be greater, such as +/−80, or may be smaller, such as +/−45 degrees or +/−30 degrees. Where the rear marine drive 21 is not steerable to 90 degrees, the thrust generated at the maximum steering position θ will have a surge component 101' that cannot be canceled out by thrust vector 115 from the lateral marine drive 15. The magnitude of the surge component 101' will depend on the maximum steering angle +/−θ, as well as the vessel dynamics. Where the maximum steering angle θ range is significantly narrowed from 90 degrees, such as 45 degrees or less, the surge component may be significant and the control system may be configured to favor utilizing the lateral drive 15 to generate sway movement to minimize the undesired surge movement of the vessel as much as possible.

Referring again to FIGS. 1 and 3-4, the system and method are configured to translate user input at the user input device, such as joystick commands, into thrust outputs for the lateral and rear marine drives. In some embodiments, the system is configured such that the user operates the user input device to provide separate commands for each of the rear drive and the lateral marine drive. Where the user interface is a joystick 40a, for example, the lateral marine drive 15 may be controlled by certain movements of the joystick 40a and the rear drive 21 may be controlled by other movements of the joystick 40a. To provide one example for illustration, the system may be configured such that twist movement 67b of the joystick handle 66 (see FIG. 3) controls the lateral thrust produced by the lateral marine drive 15, where the magnitude and direction of the handle twist is mapped to or otherwise associated with the direction and magnitude of output from the lateral drive 15. Sideways deflection 67a of the joystick handle 66 may control steering of the rear marine drive 21, and forward/backward deflection may control output magnitude from the rear drive 21.

Alternatively, the system may be configured such that twist movement 67b of the joystick handle 66 controls steering of the rear marine drive 21, where magnitude and direction of twist is associated with steering angle and direction, and sideways movement 67a of the joystick handle 66 controls the lateral thrust produced by the lateral marine drive 15, where the magnitude and direction of sideways handle deflection is associated with the magnitude and starboard/port direction of output from the lateral drive 15. Thereby, the user can select which drive to control by selectively controlling the joystick, and can control both simultaneously, such as by manipulating the joystick with a sideways deflection and a twist movement.

In other embodiments, the system may be configured to provide integrated user input control, where the user provides a single input motion representing desired motion of the vessel and the control system operates both the lateral and rear drive based on the single user input to effectuate the commanded movement. In such embodiments, the control system 33 is configured to selectively activate the lateral drive 15 and/or rear drive 21 to accomplish the desired vessel motion, and may be configured to account for additional system constraints such as battery charge level and drive capabilities and responsiveness, or additional environmental constraints such as wind and waves. Thereby, lateral drive output and rear drive output (including lateral drive thrust direction and magnitude, rear drive steering, and rear drive output/RPM) are blended to provide proportional maneuverability of the vessel in the axis that the joystick handle 66 is deflected.

The propulsion system 100 may be configured with a velocity-based control system 33 where the user inputs are correlated with inertial velocity values for the marine vessel. In one such embodiment, the control system may be a model-based system where the thrust outputs are determined based on modeled vessel behavior that accounts for the vessel dimensions and the locations and thrust capabilities of each of the lateral and rear marine drives. Alternatively, the control system 33 may be configured to utilize a map relating joystick positions to thrust magnitude outputs, including magnitude and direction, for each of the lateral and rear marine drives.

Figure 8:
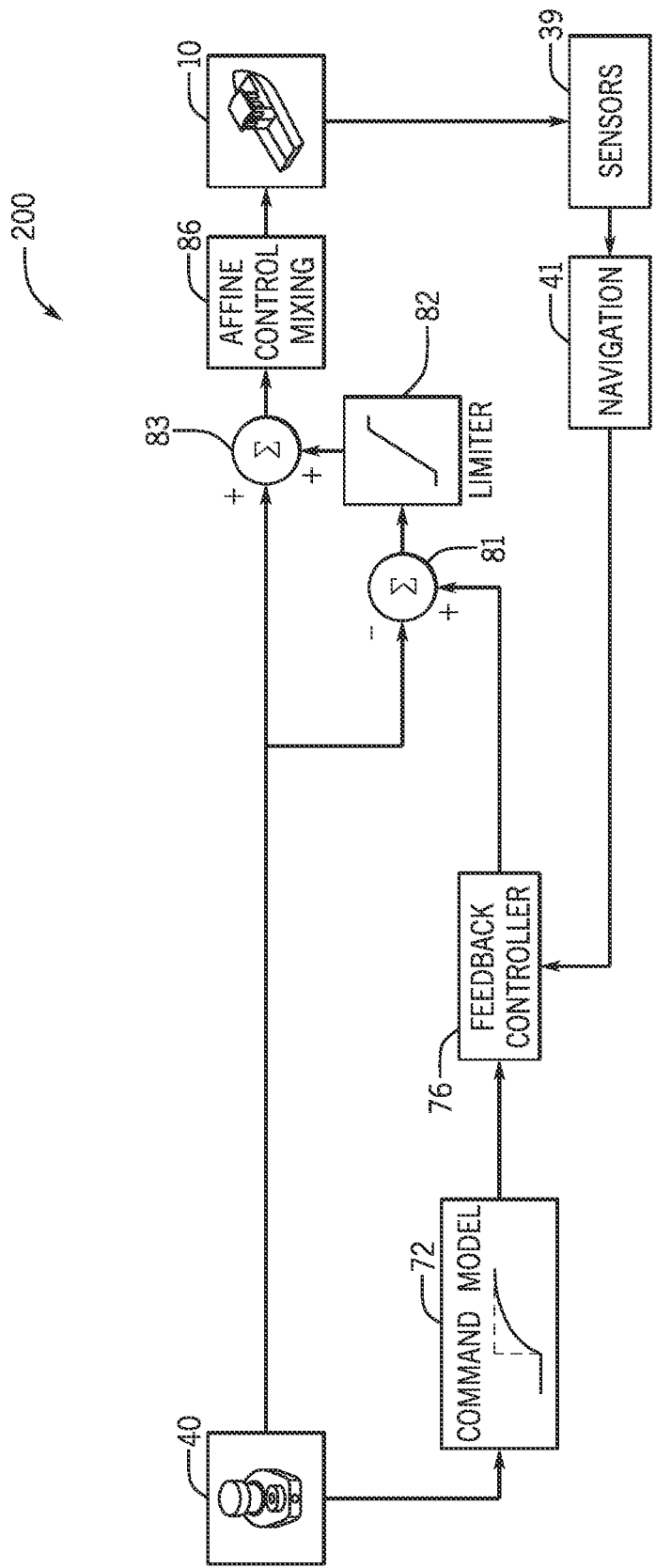
FIG. 8 is a diagram illustrating an exemplary method and control system for controlling propulsion of the marine vessel based on joystick inputs in accordance with the present disclosure.

FIG. 8 is a flowchart schematically depicting one embodiment of a control method 200, such as implemented at the controller 34, for controlling low-speed propulsion of a marine vessel. The depicted method 200 may be implemented upon user engagement of a corresponding control mode to enable precision joystick control, such as a docking mode or other precision control mode. In the depicted embodiment, the control strategy is a closed-loop algorithm that incorporates feedback into the thrust command calculations by comparing a target inertial velocity or target acceleration to an actual measured velocity and/or measured acceleration of the marine vessel to provide accurate control that accounts for situational factors in the marine environment—e.g. wind and current—and any inaccuracies or uncertainties in the model. An affine control mixing strategy is utilized to convert surge (fore/aft) velocity commands, sway (starboard/port) velocity commands, and yaw velocity commands into values that can be used to control the marine drives, including thrust magnitude command values (e.g., demand percent, rotational speed, throttle position, current or torque amounts, etc.), thrust direction commands (e.g., forward or reverse), and steering commands for the steerable drives (e.g., angular steering position). Exemplary embodiments of each aspect of this control strategy are subsequently discussed.

Signals from the joystick user input device 40a (e.g., a percent deflection +/−100% in each of the axis directions) are provided to the command model 72, which computes the desired inertial velocity or desired acceleration based on the raw joystick position information. The inertial velocity may include a surge velocity component, a sway velocity component, and/or a yaw velocity component. The command model 72 is configured based on the locations and thrust capabilities of the drives and the vessel response to accurately approximate how fast the vessel will translate and/or turn in response to a user input. In certain embodiments, the command model may be tunable by a user to adjust how aggressively the propulsion system 100 will respond to user inputs. For example, secondary inputs may be provided that allow a user to input preference as to how the vessel will respond to the joystick inputs, such as to increase or decrease the desired inertial velocity values associated with the joystick positions and/or to select stored profiles or maps associated with user input values to desired velocity values. For example, the user inputs may allow a user to instruct an increase or decrease in the aggressiveness of the velocity response and/or to increase or decrease a top speed that the full joystick position (e.g. pushing the joystick to its maximum outer position) effectuates.

For example, the command model 72 may include a map correlating positions of the joystick to inertial velocity values, associating each possible sensed position of the joystick to a target surge velocity, a target sway velocity, and/or a target yaw velocity. For example, the neutral, or centered, position in the joystick is associated with a zero inertial velocity.

Output from the command model 72, such as target surge, sway, and yaw velocities (or could be desired surge, sway, and yaw acceleration), is provided to the drive controller 76. The drive controller 76 is configured to determine thrust commands, including desired thrust magnitude and desired direction, for each of the drives 15 and 21 based on the target surge, sway, and yaw velocities or accelerations. The drive controller 76 may be a model-based controller, such as implementing a vessel dynamics model (e.g., an inverse plant model), optimal control modeling, a robust servo rate controller, a model-based PID controller, or some other model-based control scheme. In a closed-loop vessel dynamics model controller embodiment, the model is utilized to both calculate feed-forward commands and incorporate feedback by comparing a target inertial velocity or target acceleration to an actual measured velocity and/or measured acceleration of the marine vessel. In a robust servo rate controller embodiment, the model is utilized to calculate feed-forward commands and the gains are computed off-line and incorporated into the control algorithm. In some embodiments, two or more different control models may be utilized, such as for calculating thrust commands for different directional control. FIG. 8 exemplifies one such embodiment.

The control model is generated to represent the dynamics and behavior of the marine vessel 10 in response to the propulsion system 100, and thus to account for the hull characteristics and the propulsion system characteristics. The hull characteristics include, for example, vessel length, a vessel beam, a vessel weight, a hull type/shape, and the like. The propulsion system characteristics include, for example, the location and thrust capabilities of each marine drive in the propulsion system 100. In certain embodiments, the model for each vessel configuration may be created by starting with a non-dimensionalized, or generic, vessel model where the hull characteristics and the propulsion system characteristics are represented as a set of coefficients, or variables, that are inputted to create a vessel model for any vessel hull and any propulsion system in the ranges covered by the model. The set of coefficients for the hull characteristics may include, for example, a vessel length, a vessel beam, a vessel weight, and a hull shape or type.

The generic model may be created utilizing stored thrust information (e.g., representing the thrust magnitude generated by the drive at each command value, such as demand percent) associated with a set of predefined drive identification coefficients. An exemplary set of coefficients for the propulsion system characteristics may include location of each marine drive and drive identification information associated with the corresponding thrust characteristics saved for that drive, such as drive type, drive size, and/or make/model, as well as available steering angle ranges for each steerable drive.

Alternatively, the drive controller 76 may implement a different, non-model-based, control strategy, such as a calibrated map correlating the target surge, target sway, and target yaw velocities/accelerations to thrust commands for each drive in the propulsion system 100 or a calibrated map correlating joystick positions to thrust commands for each drive in the propulsion system 100. Additionally, the map may be configured to account for further control parameters in the thrust command determinations, such as battery charge level (e.g., battery SOC), of a power storage system associated with one or more of the marine drives 15 and 21, generated fault conditions for one or more of the marine drives 15 and 21, or the like, whereby each control parameter is represented as an axis on the map and a corresponding input is provided for determining the thrust commands.

The output of the drive controller 76 is compared to the joystick position information at summing point 81 (e.g., to the percent deflection value). The summed output is again subject to a limiter 82, which limits the authority of the controller 76 and accounts for fault modes. The output of the limiter 82 is summed with the joystick values at summing point 83. That summed value is provided to the affine control mixer 86, which generates a total X and Y direction command for the marine drive. From there, the powerhead control commands, shift/motor direction commands, and steering actuator control commands (for the steerable drives) are determined for each marine drive 15 and 21. An exemplary embodiment of affine mixing is described in U.S. Pat. No. 10,926,855, which is incorporated herein by reference.

In certain embodiments, the drive controller 76 may be configured and implemented as a closed-loop control system, wherein the thrust commands are further calculated based on comparison of the measured and target values. In the closed-loop control strategy depicted in FIG. 8, the drive controller 76 is configured to determine the thrust commands based further on a comparison of the target values outputted from the command model 72, namely target surge velocity, target sway velocity, and/or target yaw velocity, to measured velocity and/or acceleration from one or more inertial and/or navigation sensors. Feedback information about the actual vessel velocity and/or acceleration is provided by one or more sensors and/or navigation systems on the marine vessel. For example, the output of the one or more velocity and/or acceleration sensors 39—such as an IMU 26, accelerometers, gyros, magnetometers, etc.—may be interpreted and/or augmented by a navigation system 41, such as a GPS 38 or an inertial navigation system. The navigation system 41 provides an actual inertial velocity (e.g., sway velocity and yaw velocity) and/or an actual acceleration that can be compared to the output of the command model 72. The controller 76 is configured to utilize such information to refine the thrust command values to accurately effectuate the desired inertial velocity, accounting for inaccuracies in the model design, malfunctions or sub-par performance of the marine drives, disturbances in the environment (e.g., wind, waves, and current), and other interferences.

Where the drive controller 76 is a map-based controller, a PID controller may be utilized in conjunction with the map-determined thrust commands to determine the final outputted thrust commands and provide closed-loop control.

Alternatively, control may be implemented in an open-loop, or feed-forward, control strategy. In a feed-forward-only command regime, the output of the drive controller 76 is utilized to control the marine drives—i.e., inputted to the affine control mixer 86 to generate thrust magnitude commands for both drives and steering commands for the rear drive 21. Accordingly, the command model 72, drive controller 76, and affine control mixer 86 can be utilized, without the feedback portion of the system depicted in FIG. 8, to control the marine drives 15 and 21 in a joysticking mode. This control strategy, which results in a very drivable and safe propulsion system 100, can be implemented on its own as a control strategy or can be implemented as a default state when the feedback portion of a closed-loop control system is inoperable (such as due to failure of navigation systems or sensors).

Figure 9:
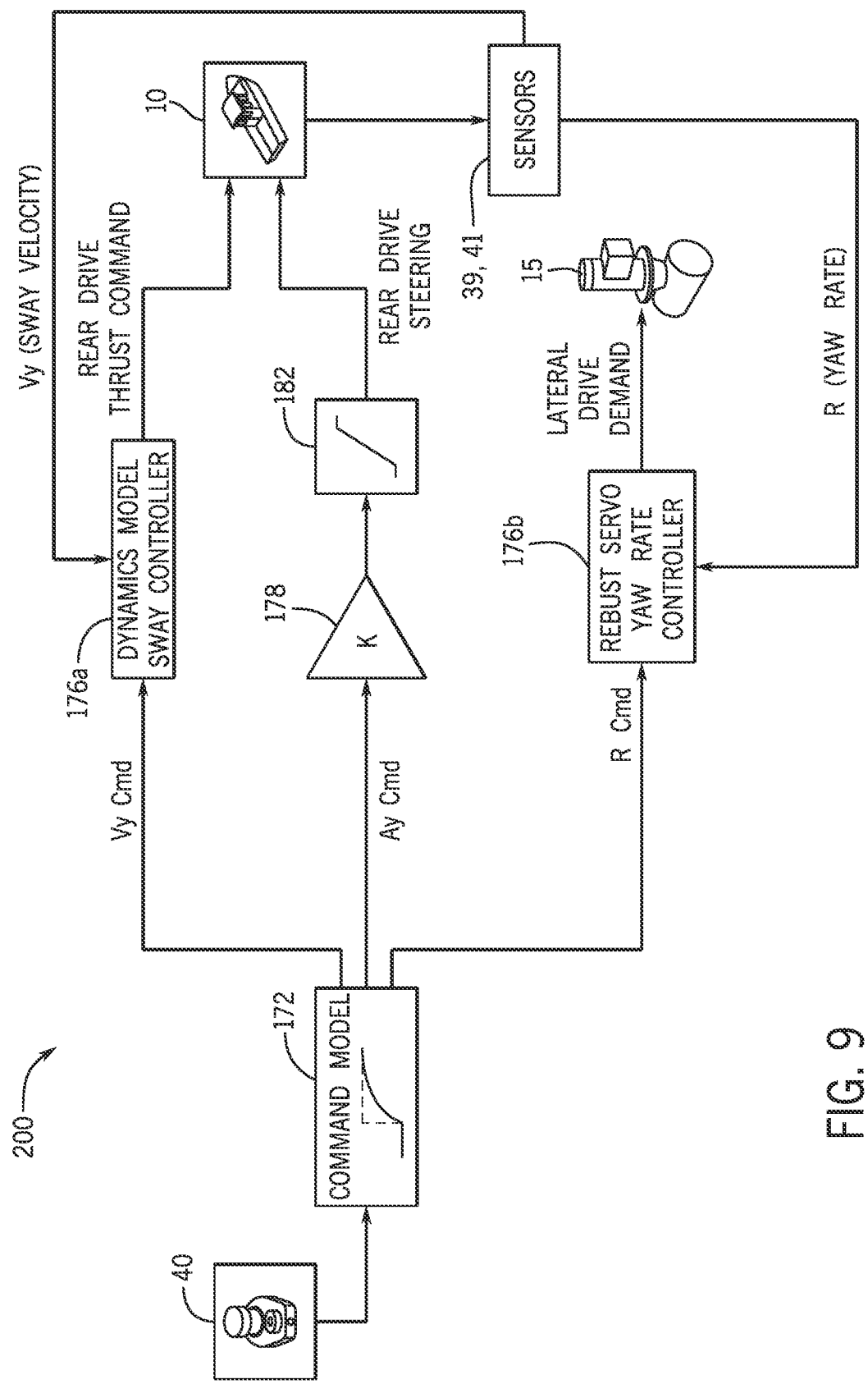
FIG. 9 is a diagram illustrating another exemplary method and control system for controlling propulsion of the marine vessel based on user inputs in accordance with the present disclosure.

FIG. 9 depicts an exemplary model-based control method 200 for controlling sway and yaw movement of the vessel. The joystick position is provided to the command model 172, which is configured to output target sway "Vy Cmd" and target yaw "R Cmd" values based on the joystick position. The command model 172 is also configured to determine the steering angles for the rear marine drive 21 based on the target sway command and/or the demanded acceleration required to reach the target sway and/or target yaw values. The command model 172 is configured to account for the thrust capability of the lateral marine drive 15, and in some embodiments also the battery SOC and/or other output capability constraints of the lateral marine drive 15, so as not to operate the rear marine drive 21 in a way cannot be counteracted by the thrust output of the lateral marine drive 15.

The steering angles "Ay Cmd" outputted by the command model 172 are provided to a gain calculator 178 configured to calculate the gain and then to limiter 182, which limits the authority to steer the drive 21 and accounts for fault modes. The target sway velocity VyCmd is provided to a model-based sway controller 176a, such as a vessel dynamics control model described above, configured to calculate the thrust command for the rear marine drive 21, including a thrust magnitude command. (e.g., an engine or motor command value tied to thrust output) and a thrust direction (e.g., forward or reverse).

The target yaw command "R Cmd" output of the command model 172 is provided to the model-based yaw rate controller 176b, which in this embodiment is implemented with a robust servo control design to control yaw rate with the lateral marine drive. Thus, the yaw rate controller 176b is configured to calculate a thrust command for the lateral marine drive 15, including a thrust magnitude command (e.g., demand percent or some other value tied to thrust output) and a thrust direction (e.g., forward or reverse directions tied to starboard or port thrust direction) provided to the lateral marine drive 15 based on the target yaw command "R Cmd" and the measured yaw command. Where the target yaw command is zero, and thus no yaw motion is desired, the yaw rate controller 176b operates to command the lateral drive 15 to generate a counteracting yaw thrust to oppose any unwanted yaw motion. For example, where the user operates the joystick 40a to command a straight rearward motion of the vessel such as exemplified in FIG. 6A, the yaw rate controller 176b actuates the lateral drive 15 based on yaw measurements from the sensors 39 (e.g., IMU 26) and/or navigation controller 41 to generate opposing yaw forces (both magnitude and direction) that cancel any unwanted yaw motion of the vessel 10.

The control strategies for the sway and yaw controllers may be implemented as closed-loop algorithms, as shown, where each of the sway and yaw controllers 176a and 176b incorporates feedback by comparing the target values to measured values. The yaw rate controller 176b receives yaw rate measurements from the sensors 39 (e.g., IMU 26) and/or navigation controller 41 and compares the measured value to the yaw command R Cmd. To effectuate a pure sway motion, for example, the yaw rate controller 176b will be targeting a yaw rate of zero and will adjust the thrust generated by the lateral marine drive to maintain zero yaw change.

The sway controller 176a receives sway velocity measurements from the sensors 39 (e.g., IMU 26) and/or navigation controller 41 and compares the measured value to the sway command "Vy Cmd". To effectuate a pure yaw motion, for example, the yaw rate controller 176b will be targeting a sway velocity of zero and will adjust the thrust generated by the rear marine drive 21 in concert with the output of the lateral drive 15 to maintain zero sway change (or to minimize uncommanded sway as much as possible within the constraints of the propulsion system).

In some embodiments, one or both of the sway controller 176a and yaw controller 176b may instead implement an open-loop strategy where the output of one or both of the controllers 176a, 176b is utilized to control the marine drives based on the respective control models without utilizing any feedback. This control strategy, which results in a very drivable and safe propulsion system 100, can be implemented on its own as a control strategy or can be implemented as a default state when the feedback portion of a closed-loop control system is inoperable (such as due to failure of navigation systems or sensors).

In certain embodiments, such as where the lateral marine drive 15 is deployable, the joysticking mode providing joystick control of the lateral drive 15 may be speed limited to operation at low speeds, such as 5 mph or less. In such an embodiment, the propulsion system is configured to operate in a user engaged mode where the joystick controls both the lateral drive 15 and the rear drive 21, and wherein the propulsion authority over at least the rear drive 21 is significantly limited to maintain the vessel 10 at low speeds appropriate for docking and maneuvering in tight spaces.

The disclosed system and method may alternatively provide user input control of the rear and lateral marine drives via a single user input device 40 configured to enable propulsion control for various speed conditions, including for low-speed docking and for on-plane vessel control. To that end, the control system 33 may be configured to determine a maximum allowable lateral output based on a speed characteristic of propulsion, such as a vessel speed or a propulsion output of the rear marine drive 21, and to control the lateral marine drive such that it does not exceed that maximum allowable lateral output. The user input authority over lateral propulsion is thus limited based on the speed characteristic, where the user's input at the user input device 40 is only effectuated up to the maximum allowable lateral output. The propulsion control system 33 may be configured to progressively limit the user input authority as the speed characteristic increases, for example to decrease a maximum allowable thrust output magnitude of the lateral marine drive 15 as the vessel speed increases. The maximum allowable lateral output may be any control variable tied to the lateral thrust magnitude produced by the lateral marine drive 15, such as is at least one of a rotational speed of the lateral marine drive, a current delivery to the lateral marine drive, a torque output of the lateral marine drive, a throttle position of the lateral marine drive (if the powerhead is an internal combustion engine), a demand percent for the lateral marine drive, or other value associated with output control.

Figure 10:
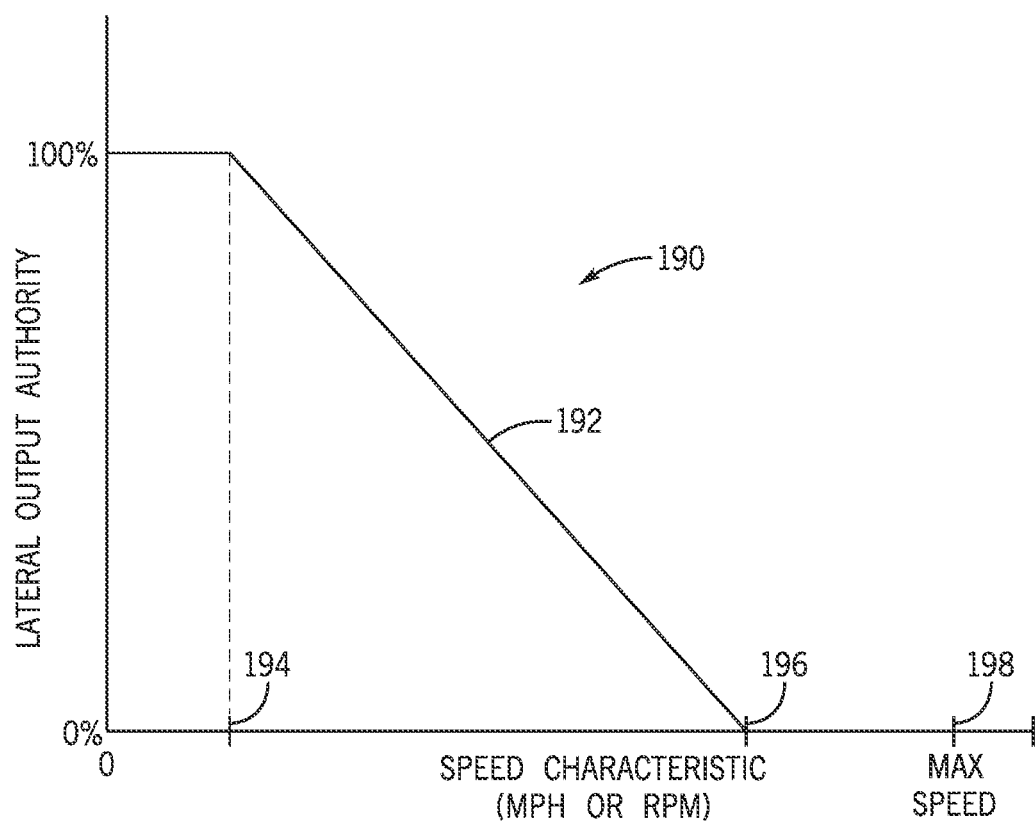
FIG. 10 is a graph of speed characteristic versus lateral output authority representing one embodiment of lateral drive control according to the present disclosure.

FIG. 10 illustrates one embodiment of lateral thrust output control based on a speed characteristic of propulsion, such as a vessel speed or a propulsion output of the rear marine drive 21 or other drive in the propulsion system 100 other than the lateral marine drive 15. Line 192 represents a maximum allowable lateral output of the lateral marine drive. The graph 190 depicts one exemplary relationship between lateral output authority over the lateral marine drive 15 and a speed characteristic of propulsion. The maximum allowable lateral output progressively decreases as the speed characteristic increases.

When the speed characteristic of propulsion is in a lower speed range, full output authority for controlling the lateral marine drive is provided. For example, in the lower speed range, the maximum allowable lateral output may be equal to a maximum capability of the lateral marine drive, such as a maximum RPM or a maximum torque output rated for the lateral marine drive, or 100 percent demand. The lower speed range may be defined based on a first speed threshold 194 below which full output authority over the lateral marine drive 15 is granted. Thus, in the lower speed range below the first speed threshold 194, the lateral marine drive 15 is controlled based on user input up to the maximum permitted output (e.g., the maximum rated capability) of the lateral marine drive.

Above the first speed threshold 194, the maximum allowable lateral output decreases, and may be configured as shown in FIG. 10 such that the maximum allowable lateral output 192 is progressively decreased as the speed characteristic increases. In the middle speed range between the first speed threshold 194 and a maximum speed threshold 196, the lateral output authority may be linearly related to the speed characteristic, as illustrated by the graph 190. Alternatively, the lateral output authority may be decreased in a stepwise function as the speed characteristic increases, such as decreased at multiple thresholds between the first speed threshold 194 and a maximum speed threshold 196. In such an embodiment, the lateral output authority may decrease below 100 percent of the absolute maximum permitted output of the lateral marine drive (e.g., to 75 percent), when the speed characteristic is above the first speed threshold, and may decrease to a second predetermined value (e.g., 50 percent) at a second speed threshold, etc. Other relationships between the lateral output authority and speed characteristic in the middle speed range are contemplated, such as a non-linear relationship. For example, the lateral output authority may decrease slowly at speeds just above the first speed threshold and the rate of decrease may increase as the speed characteristic approaches the maximum speed threshold 196.

The maximum allowable lateral output may be zero in an upper speed range of the speed characteristic so that the lateral marine drive 15 does not produce any thrust output at high speeds, such as when the marine vessel is on plane. As exemplified in FIG. 10, the control system 33 may be configured to set the maximum allowable lateral output 192 to zero when the speed characteristic exceeds the maximum speed threshold 196, and the maximum allowable lateral output is maintained at zero up to the absolute maximum speed 198. The absolute maximum speed 198 is, for example, a maximum achievable forward-direction vessel speed for the propulsion system 100 or maximum achievable output of the rear marine drive 21.

The maximum speed threshold 196 at which the maximum allowable lateral output 192 is set to zero may be anywhere between the first speed threshold and the absolute maximum speed 198, and may be a configurable value based on the configuration of the marine vessel, including the hull shape, vessel stability, propulsion capabilities, intended purpose of the vessel 10, etc. For example, the maximum speed threshold 196 may be set equal to or less than an expected planing speed of the marine vessel 10. Alternatively, the maximum speed threshold 196 may be significantly less than the planing speed. In one example, the maximum speed threshold 196 such as at or above the upper end of a traditional joysticking speed range, such as around 10-12 miles per hour or propulsion output values associated therewith. In still other embodiments, some lateral propulsion output may be permitted for speed characteristics above the expected planing speed threshold. For example, large and stable vessels, some non-zero percentage of lateral output authority may be maintained up to the absolute maximum speed 198.

Figure 11:
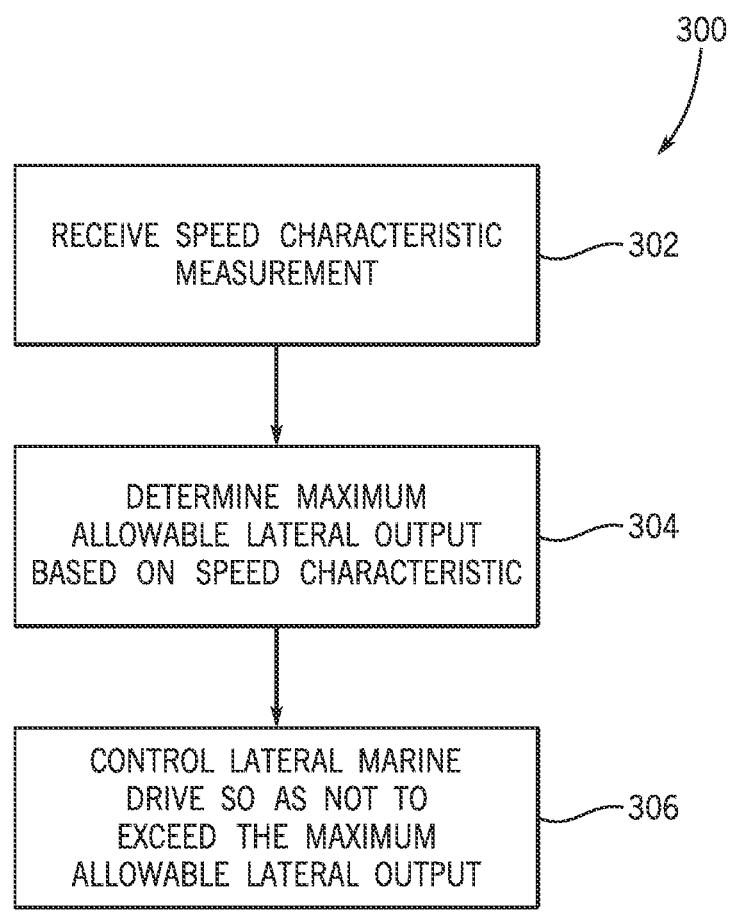
FIGS. 11-12 are flow charts depicting exemplary methods of controlling a marine propulsion system according to the present disclosure.
Figure 12:
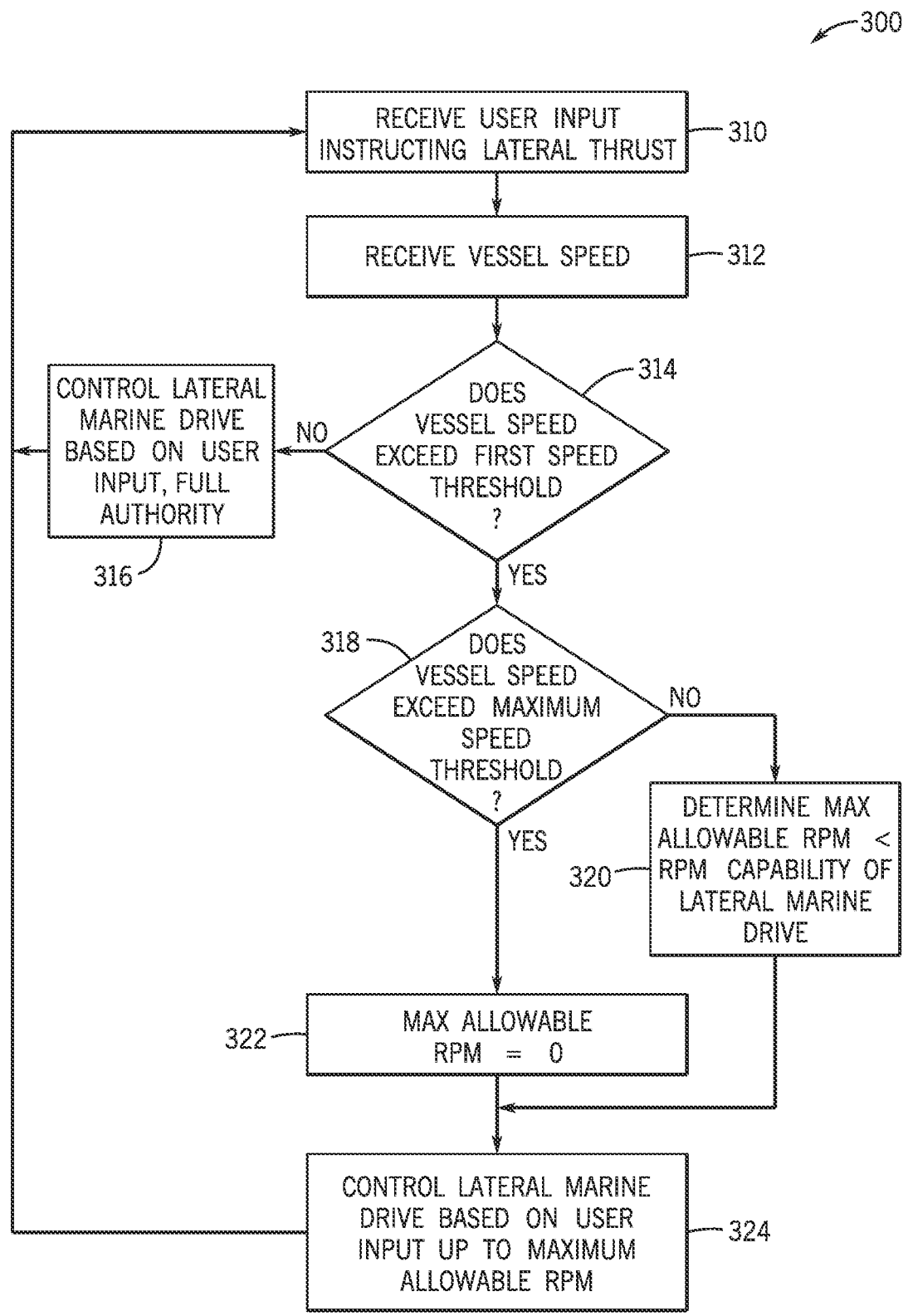

FIGS. 11 and 12 are flowcharts depicting exemplary embodiments of a method 300 of controlling marine propulsion to decrease lateral output authority based on a speed characteristic of propulsion. In FIG. 11, a speed characteristic measurement is received at step 302. Various embodiments of the speed characteristic are described above, including utilizing measured vessel speed as the speed characteristic or utilizing propulsion output of a rear marine drive or other marine drive in the propulsion system other than the lateral marine drive. Where the speed characteristic is vessel speed, the vessel speed measurement may be received from a vessel speed sensor, such as a paddle wheel or pitot tube, or may be a pseudo vessel speed calculated based on GPS and/or IMU measurements. Where the speed characteristic is based on propulsion output of one or more other marine drives (e.g., rear marine drive 21), the speed characteristic may be based on rotational speed measurements of the powerhead or propulsor of the other marine drive.

A maximum allowable lateral output is then determined at step 304 based on the speed characteristic. In one embodiment, a table may be stored in memory and utilized by the control system providing maximum allowable lateral output values indexed based on speed characteristic values. Alternatively, the control system 33 may be configured to calculate the maximum allowable lateral output value by a formula relating allowable output to speed characteristic. In still other embodiments, such as in the model-based embodiments described above, the model may be configured to limit lateral output authority at high speeds, by using a vessel model that may factor in information such as, but not limited to, hull weight, hull size, and/or engine propeller thrust to calculate what engine demand or rpm will result in the desired lateral authority speed limit. A model-based strategy may use the vessel characteristics, such as hull size, weight, and propeller specifications, to solve for an engine demand/rpm that will specify one or more speeds at which to cut off or reduce the thruster authority. The speed characteristic (e.g., demand or RPM command) of the rear drive(s) is then used to determine when to reduce or block the thruster.

In certain embodiments, the user thrust command associated with the user input device position, such as the joystick handle 66 position, may be remapped based on the maximum allowable lateral output. For example, the maximum handle deflection in the sideways direction 67*a* (FIG. 3) may be associated with the maximum allowable lateral output, and the lateral positions between the centered position and the maximum handle deflection in the sideways direction may be remapped and associated with a lateral output value between zero and the maximum allowable lateral output. Thereby, the user input device is configured to provide more precise user control over lateral output in the allowable range.

The lateral marine drive 15 is then controlled so as not to exceed the maximum allowable lateral output. The lateral marine drive 15 is controlled based on user input, such as at the joystick 40A, such that the output may be less than the maximum allowable lateral output but does not exceed that value. In embodiments with integrated control of the rear marine drive 21 based on a single propulsion demand input, the control system 33 increases propulsion output of the rear marine drive 21 to compensate where possible for the decrease in output from the lateral marine drive 15. Regardless, only the lateral marine drive 15, or multiple lateral marine drives, configured to provide lateral propulsion output and not rear propulsion, are controlled based on the maximum allowable lateral output. Thus, rear propulsion output is granted full authority even when the lateral output authority is limited.

FIG. 12 depicts another embodiment of a method 300 of controlling marine propulsion according to the present disclosure. A user input instructing lateral thrust is received at step 310, such as via the user input device 40. A vessel speed is received at step 312, where the vessel speed is the speed characteristic of propulsion utilized to determine lateral drive output authority. Instructions are executed at step 314 to determine whether the vessel speed exceeds a first speed threshold. If the vessel speed does not exceed the first speed threshold, then full output authority is given for controlling lateral thrust output from the lateral marine drive 15. The lateral marine drive 15 is controlled at step 316 based on the received user input providing a propulsion demand input. Output thrust for the lateral marine drive may be calculated by any of the methods described above.

If the vessel speed does exceed the first speed threshold at step 314, then the maximum allowable lateral output is calculated to limit user authority over lateral thrust by the at least one lateral marine drive 15. In the depicted example, instructions are executed at step 318 to determine whether the vessel speed exceeds a maximum speed threshold. If the vessel speed is between the first speed threshold and the maximum speed threshold, then a maximum allowable RPM is determined at step 320, which will be less than the maximum capability of the lateral marine drive 15 and less than an absolute maximum speed characteristic for the lateral drive 15. For example, a maximum allowable RPM of the lateral marine drive 15 may be determined as the output limitation of the lateral marine drive 15, where the maximum allowable RPM is less than the RPM capability of the lateral marine drive 15.

Once the vessel speed exceeds the maximum speed threshold, then the maximum allowable RPM is set to zero, as presented by step 322. At step 324, the lateral marine drive 15 is controlled based on user input up to the maximum allowable RPM or other maximum allowable lateral output value. When the maximum allowable RPM or other maximum allowable lateral output value is set to zero, then the lateral marine drive 15 is not permitted to generate any lateral thrust output.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine propulsion system for a marine vessel comprising:
    one steerable rear marine drive positioned along a centerline of the marine vessel and configured to generate forward and reverse thrusts, wherein the rear marine drive is steerable about a vertical steering axis to a range of steering angles;
    a lateral marine drive positioned at a bow region of the marine vessel and at a fixed angle with respect to the marine vessel, wherein the lateral marine drive is configured to generate lateral thrust on the marine vessel;
    a user input device operable by a user to provide a propulsion demand input commanding surge movement, sway movement, and yaw movement of the marine vessel; and
    a control system configured to control steering and thrust of the rear marine drive and thrust of the lateral marine drive based on the propulsion demand input to generate the surge movement, the sway movement, and/or the yaw movement commanded by the user.

2. The system of claim 1, wherein the lateral marine drive is configured to rotate a propeller in a first direction to generate a starboard direction lateral thrust and to rotate the propeller in an opposite direction of the first direction to generate a port direction lateral thrust.

3. The system of claim 1, wherein the lateral marine drive is a variable speed drive wherein rotational speed of the lateral marine drive is controllable by the control system, and/or wherein the lateral marine drive is deployable for use and retractable when not in use.

4. The system of claim 1, wherein the rear marine drive is positioned to extend rearward of a stern of the marine vessel and includes an engine or an electric motor powering rotation of a propeller.

5. The system of claim 4, wherein the rear marine drive is configured to be steerable between a centered steering position and at least 90 degrees in at least one direction.

6. The system of claim 1, wherein the system is configured to operate in at least a first mode where the user input device controls only the lateral marine drive and a second mode where the user input device controls both the lateral marine drive and the rear marine drive; and
    wherein the control system is configured to receive user selection of the second mode prior to controlling steering and thrust of the rear marine drive and thrust of the lateral marine drive based on the propulsion demand input.

7. The system of claim 6, wherein the user input device is a joystick, wherein the control system configured to operate in the second mode such that a movement of the joystick simultaneously controls both the lateral marine drive and the rear marine drive.

8. The system of claim 6, wherein the system configured to operate in the second mode to separately control the lateral marine drive and the rear marine drive.

9. The system of claim 8, wherein the user input device is a joystick and wherein the system is configured such that a twist movement of the joystick controls one of lateral thrust produced by the lateral marine drive or steering of the rear marine drive, and sideways deflection of the joystick controls the other one of lateral thrust produced by the lateral marine drive or steering of the rear marine drive.

10. The system of claim 1, wherein the control system is further configured to:
    determine a maximum allowable lateral output based on a speed characteristic; and
    control the lateral marine drive based on the propulsion demand input such that the lateral marine drive does not exceed the maximum allowable lateral output.

11. The system of claim 10, wherein the control system is configured to progressively decrease the maximum allowable lateral output as the speed characteristic increases above a threshold speed, and wherein the speed characteristic is at least one of a vessel speed and a rotational speed of the rear marine drive.

12. The system of claim 1, further comprising a closed-loop yaw controller configured to determine a lateral thrust command based at least in part on a sensed yaw motion of the marine vessel, wherein the control system is configured to utilize the closed-loop yaw controller to control the lateral marine drive to effectuate the lateral thrust command.

13. The system of claim 1, wherein the control system is further configured to associate the propulsion demand input with a target velocity and/or a target acceleration and to utilize a control model to solve for at least one of a sway command and a yaw command for each of the lateral marine drive and the rear marine drive based on the target velocity and/or the target acceleration.

14. The system of claim 1, wherein the control system is further configured to calculate a thrust command for each of the lateral marine drive and the rear marine drive and a steering position command for the rear marine drive based on the propulsion demand input and a location of each of at least the lateral marine drive and the rear marine drive with respect to a center of turn of the marine vessel.

15. The system of claim 1, further comprising a map stored in memory accessible by the control system, the map configured to correlate all possible propulsion demand inputs from the user input device to thrust commands for each of the lateral marine drive and the rear marine drive;
    wherein the control system is configured to utilize the map to determine a thrust command for each of the lateral marine drive and the rear marine drive based on the propulsion demand input.

16. A method of controlling a marine propulsion system for a marine vessel, wherein the marine propulsion system includes one steerable rear marine drive positioned along a centerline of the marine vessel and a lateral marine drive positioned at a fixed angle on a bow region of the marine vessel and configured to generate lateral thrust on the marine vessel, the method comprising:

receiving from a user input device a propulsion demand input commanding a surge movement, a sway movement, and/or a yaw movement of the marine vessel;

determining a rear thrust command and a steering position command for the rear marine drive and a lateral thrust command for the lateral marine drive based on the propulsion demand input; and controlling the rear marine drive based on the rear thrust command and the steering position command and controlling the lateral marine drive based on the lateral thrust command so as to generate the surge movement, the sway movement, and/or the yaw movement commanded.

17. The method of claim 16, wherein the marine propulsion system is configured to operate in at least a first mode where the user input device controls only the lateral marine drive and a second mode where the user input device controls both the lateral marine drive and the rear marine drive, and further comprising receiving user selection of the second mode prior to controlling steering and thrust of the rear marine drive and thrust of the lateral marine drive based on the propulsion demand input.

18. The method of claim 17, wherein the lateral marine drive is deployable for use and retractable when not in use, and further comprising receiving user input to deploy the lateral marine drive prior to operating the marine propulsion system in the second mode.

19. The method of claim 16, further comprising:

determining a maximum allowable lateral output based on a speed characteristic; and controlling the lateral marine drive based on the propulsion demand input such that the lateral marine drive does not exceed the maximum allowable lateral output.

20. The method of claim 19, further comprising progressively decreasing the maximum allowable lateral output as the speed characteristic increases above a threshold speed, and wherein the speed characteristic is at least one of a vessel speed and a rotational speed of the rear marine drive.

21. The method of claim 16, wherein the rear thrust command and the steering position command for the rear marine drive and the lateral thrust command for the lateral marine drive are based on the propulsion demand input and a location of each of at least the lateral marine drive and the rear marine drive with respect to a center of turn of the marine vessel.

22. The method of claim 16, further comprising storing a control model representing hull characteristics and propulsion system characteristics, including location and thrust characteristics of each of the rear marine drive and the lateral marine drive; and utilizing the control model to determine each of the rear thrust command and the lateral thrust command.

23. The method of claim 16, wherein determining the lateral thrust command includes utilizing a closed-loop yaw controller to determine the lateral thrust command based at least in part on sensed yaw motion of the marine vessel.

24. The method of claim 23, wherein the received propulsion demand input commands zero yaw movement, and wherein a magnitude and a direction of the lateral thrust command is determined based on the sensed yaw motion to generate an opposing yaw thrust.

25. The method of claim 16, further comprising storing a map configured to correlate all possible propulsion demand inputs from the user input device to thrust commands for each of the lateral marine drive and the rear marine drive and to a steering command for the rear marine drive;

utilizing the map to determine the lateral thrust command and the rear thrust command and the steering position commands based on the propulsion demand input received from the user input device.

26. The method of claim 16, wherein the rear marine drive is configured to be steerable between a centered steering position and at least 90 degrees in at least one direction, wherein determining the steering position command for the rear marine drive includes determining a steering position between the centered steering position and at least 90 degrees.

* * * * *